(12) United States Patent
Tiedemann, Jr. et al.

(10) Patent No.: US 7,158,796 B2
(45) Date of Patent: Jan. 2, 2007

(54) APPARATUS, SYSTEM, AND METHOD FOR AUTONOMOUSLY MANAGING REVERSE LINK COMMUNICATION RESOURCES IN A DISTRIBUTED COMMUNICATION SYSTEM

(75) Inventors: Edward G. Tiedemann, Jr., Concord, MA (US); Avinash Jain, San Diego, CA (US); Tao Chen, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 101 days.

(21) Appl. No.: 10/864,652

(22) Filed: Jun. 8, 2004

(65) Prior Publication Data

US 2005/0037771 A1 Feb. 17, 2005

Related U.S. Application Data

(60) Provisional application No. 60/479,252, filed on Jun. 16, 2003, provisional application No. 60/480,155, filed on Jun. 19, 2003.

(51) Int. Cl.
*H04Q 7/20* (2006.01)
(52) U.S. Cl. ........................................ 455/453; 370/329
(58) Field of Classification Search ................ 455/453, 455/445, 450, 452, 67.11, 423; 370/328, 370/329
See application file for complete search history.

(56) References Cited

U.S. PATENT DOCUMENTS

| | | | |
|---|---|---|---|
| 5,923,650 A | 7/1999 | Chen et al. | .................. 370/331 |
| 6,005,852 A | 12/1999 | Kokko et al. | ................ 370/329 |
| 6,563,810 B1* | 5/2003 | Corazza | ........................ 370/335 |
| 2003/0086397 A1* | 5/2003 | Chen | ............................ 370/335 |
| 2004/0185868 A1* | 9/2004 | Jain et al. | ..................... 455/453 |
| 2005/0059408 A1* | 3/2005 | Tiedemann et al. | ....... 455/452.1 |

FOREIGN PATENT DOCUMENTS

| | | | |
|---|---|---|---|
| EP | 1180881 A1 | | 2/2002 |
| EP | 1213869 A1 * | | 6/2002 |

* cited by examiner

*Primary Examiner*—George Eng
*Assistant Examiner*—Julie E Stein
(74) *Attorney, Agent, or Firm*—Philip R. Wadsworth; Thien Nguyen; Sayed Hossain Beladi

(57) ABSTRACT

An apparatus, system, and method efficiently manage reverse link communication in a communication system having geographically distributed base stations. A base station functioning to at least one mobile station as a non-serving active base station estimates an expected coupled load due to the at least one mobile based on a previous total coupled load. The base station determines a total available capacity based on the difference between the total capacity of the base station and the estimated expected coupled load. The base station allocates reverse link resources to other mobile stations served by the base station so as not to exceed the total available capacity. Since the allocation of reverse link channels resources are controlled directly by the base station, delays due to communications with a central controller are eliminated. As a result, adverse effects of load scheduling based on obsolete reverse channel information are minimized.

12 Claims, 10 Drawing Sheets

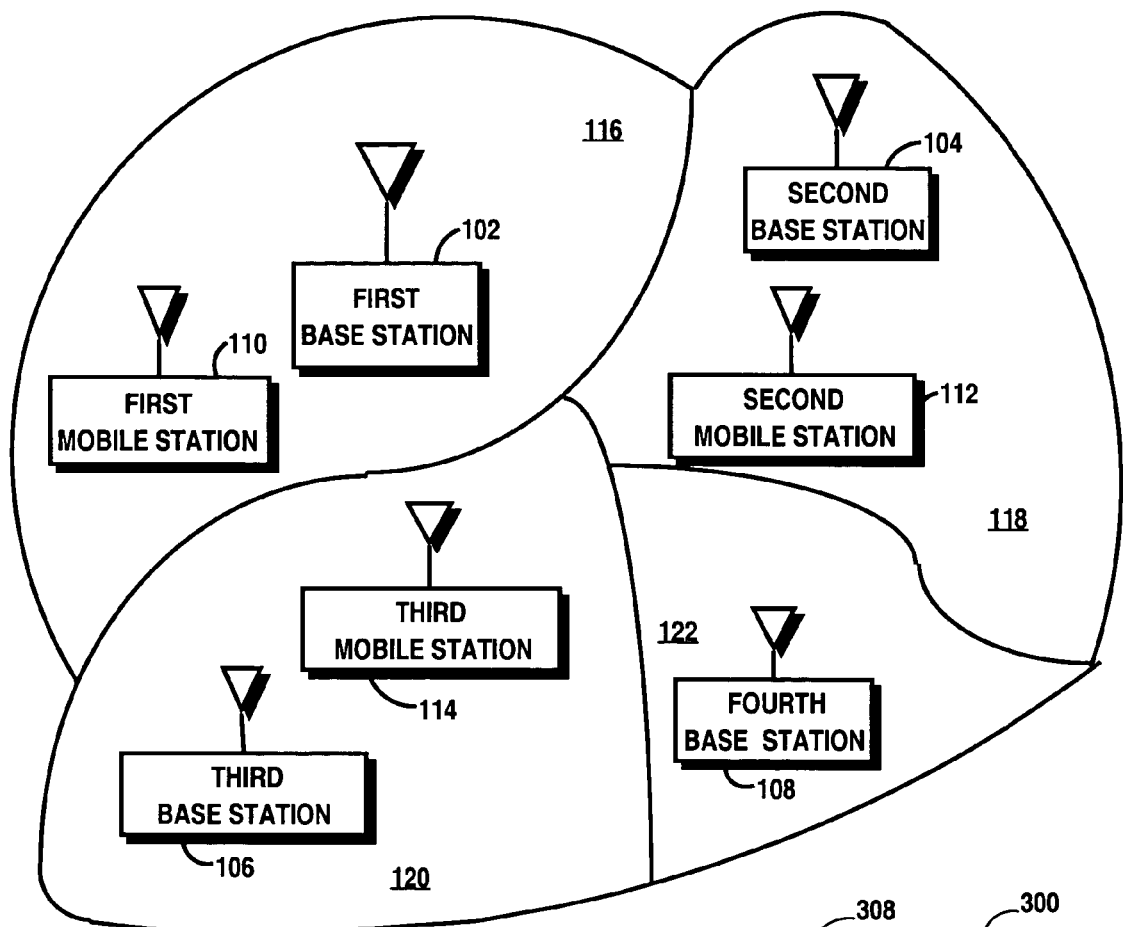
FIG. 1
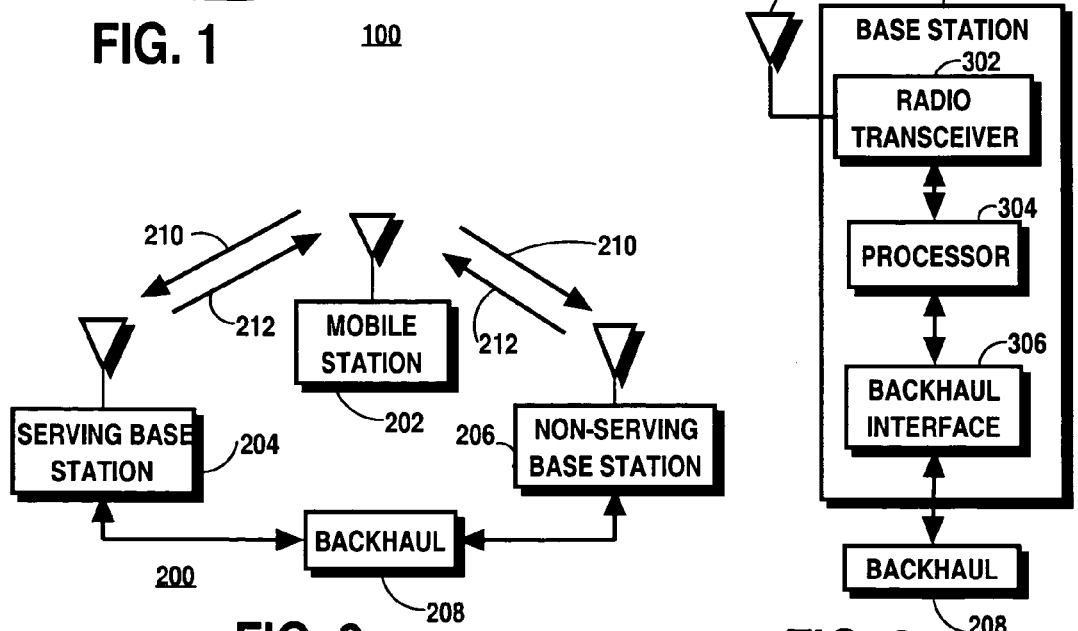
FIG. 2
FIG. 3

| | FIRST BS (102) | SECOND BS (104) | THIRD BS (106) | FOURTH BS (108) |
|---|---|---|---|---|
| SERVING | FIRST MS | SECOND MS | THIRD MS | NONE |
| NON-SERVING | SECOND MS AND THIRD MS | FIRST MS AND THIRD MS | FIRST MS AND THIRD MS | FIRST MS SECOND MS AND THIRD MS |

APPARATUS, SYSTEM, AND METHOD FOR AUTONOMOUSLY MANAGING REVERSE LINK COMMUNICATION RESOURCES IN A DISTRIBUTED COMMUNICATION SYSTEM

CROSS-REFERENCE TO RELATED APPLICATIONS

This application claims the benefit of priority of US Provisional application Ser. No. 60/479,252, filed on Jun. 16, 2003, entitled "Method And Apparatus for Distributed Control Of Reverse Link Communication Load Scheduling", and U.S. provisional application Ser. No. 60/480,155, filed on Jun. 19, 2003, entitled "Method And Apparatus for Distributed Control Of Reverse Link Communication Load Scheduling" which are incorporated by reference in their entirety herein. This application is related to U.S. Patent Publication No. 2005-0059408 filed concurrently with this application and entitled "Apparatus, System, And Method for Managing Reverse Link Communication Resources in a Distributed Communication System."

BACKGROUND OF THE INVENTION

The invention relates in general to communication systems and more specifically to an apparatus, system, and method for managing reverse link (uplink) communications in a communication system.

Many wireless communication systems employ geographically distributed base stations to provide communication cells or regions where a serving base station provides communication service to mobile stations within the region corresponding to the serving base station. In certain situations, the reverse link signals transmitted from each mobile station to a base station interfere with other reverse link signals transmitted from other mobile stations. Because of the interference and limited resources, the capacity of each base station is limited. A reverse link capacity of a base station is affected by the reverse link load due to the mobile stations served by the base station, by the coupled reverse link load due to mobile stations served by other base stations and by other noise sources. Reverse link load scheduling provides a mechanism for maximizing efficient use of system resources by controlling the transmissions of mobile stations. In conventional communication systems, a centralized controller evaluates the reverse link load and the reverse link coupled load, as well as other factors, to determine the appropriate load scheduling. For most data applications, however, mobile stations are controlled by a single serving base station to reduce scheduling delays although the reverse link transmissions can affect the load at other base stations.

Conventional systems, however, are limited in several ways. For example, the communications with the centralized controller result in significant delays. Information gathered by each base station is forwarded to the centralized controller. The centralized controller processes the information, determines an optimum load capacity for each base station, and sends the optimum load capacity to each of the base stations. Each base station limits the communications of the mobile stations that it is serving in accordance with the updated load capacity provided by the controller. The channel conditions, however, often change during the time that is required to transmit, process, and receive the optimum load capacity. Accordingly, a base station may be operating at a level significantly different from the optimum level resulting in unused resources or an overload condition. An overload condition may occur, for example, where a base station operating in accordance with the latest optimum capacity information that was provided by the controller may overload another base station that is attempting to operate near its maximum capacity because delays in the system have not allowed the new channel conditions to be reflected in the information conveyed to the base stations. Overload conditions lead to lost data, re-transmissions of messages, and other undesired consequences.

Accordingly, there is need for an apparatus, system, and method for efficiently allocating reverse channel resources in a communication system with geographically distributed base stations.

BRIEF DESCRIPTION OF THE DRAWINGS

FIG. 1 is a block diagram of communication system having geographically distributed base stations in accordance with the exemplary embodiments of the invention.

FIG. 2 is a block diagram of a portion of the communication system where a single mobile station is in communication with base stations functioning as a serving base station and a non-serving base station.

FIG. 3 is a block diagram of a base station in accordance with an exemplary embodiment of the invention.

DETAILED DESCRIPTION OF THE PREFERRED EMBODIMENTS

Figures 4, 5:
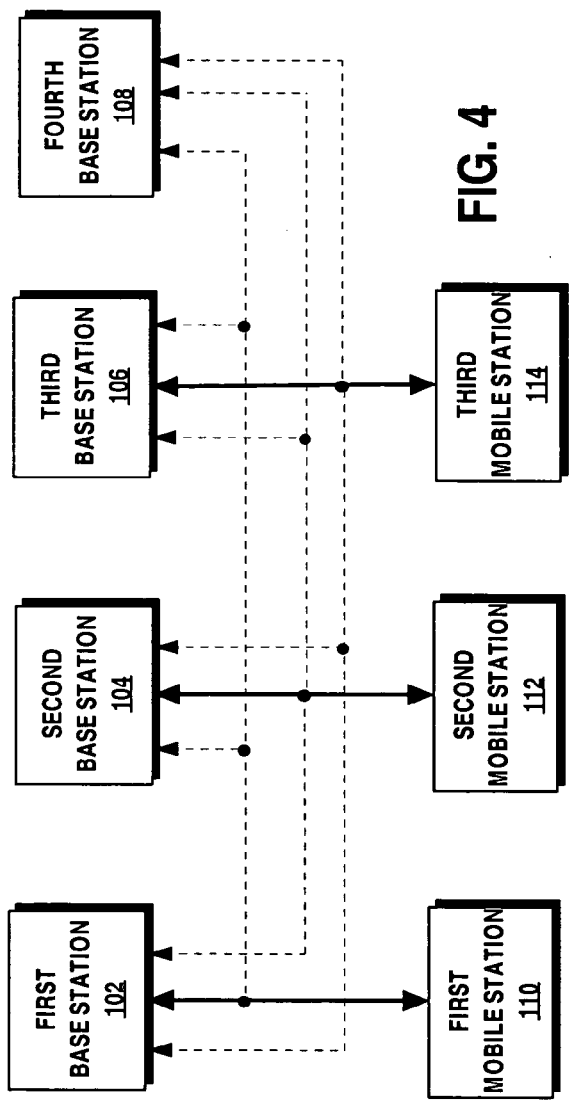
FIG. 4 is a block diagram illustrating an exemplary relationship between the mobile stations and the base stations in accordance with the exemplary embodiments of the invention.
FIG. 5 is a table illustrating the exemplary relationship between the mobile stations and the base stations in accordance with the exemplary embodiments of the invention.

An apparatus, system, and method manage reverse link communication in a distributed base station communication system. In the exemplary embodiments discussed herein, reverse link communication is distributively managed by base stations within a communication system. Delays associated with conventional techniques for managing reverse link channels are avoided since the reverse link management is not dependent on communications with a central controller. In a first exemplary embodiment, a non-serving base station determines a coupled load indicator based on coupled load parameters detected at the non-serving base station due to a mobile station that has identified another base station as the serving base station. The coupled load parameters are parameters that provide an indication of the coupled load experienced at the non-serving base station and may include parameters such as a normalized and averaged received signal-to noise ratio (SNR) and a mobile station speed. A coupled load indicator based on the coupled load parameters is forwarded to the serving base station. The serving base station calculates an expected coupled load at the non-serving base station based on the coupled load indicator and a mobile station transmission parameter such as a scheduled transmission data rate. The expected coupled load is forwarded to the non-serving base station, where the non-serving base station calculates the available capacity by accounting for the expected coupled load. Mobile stations served by the non-serving base station are load scheduled in accordance with the calculated available capacity.

In a second exemplary embodiment, a non-serving base station calculates the maximum tolerable coupled load due to the mobile stations that are scheduled by some other serving base station. The non-serving base station determines a coupled load indicator based on coupled load parameters (such as a normalized and averaged receive signal-to noise ratio (SNR)) at the non-serving base station due to every mobile station that has identified some other base station as the serving base station. In the second exemplary embodiment, the maximum tolerable coupled load associated with the non-serving base station is forwarded to the serving base station every scheduling period and the measured coupled load indicators of mobile stations are forwarded to the serving base station at a relatively lower frequency. Since the serving base station under consideration may also be a non-serving base station for some other mobile stations, the serving base station also determines a maximum tolerable coupled load from the mobile stations that are served by other base stations. The base station performs load scheduling in accordance with the maximum tolerable coupled load reserved for mobile stations not being scheduled by the base station while meeting the constraints imposed by the maximum tolerable coupled load received from other base stations.

In a third exemplary embodiment of the invention, a serving base station schedules the mobile station reverse link transmissions in accordance with an estimated expected coupled load due to reverse link transmissions of mobile stations served by other base stations. Each base station estimates the expected coupled load due to mobile stations served by other base stations. Based on the estimated coupled load and the capacity of the base station, the base station load schedules the mobile stations served by the base station. In the third exemplary embodiment, therefore, the base stations do not receive explicit or direct coupled load information from other base stations. Accordingly, the third exemplary embodiment is particularly useful where the backhaul does not support communication of coupled load information between base stations. Although any of several techniques may be used to calculate the estimated coupled load, the estimations are based on previous reverse link transmissions of the mobile stations in the third exemplary embodiment. Each base-station measures the coupled load from the mobile stations not being scheduled by the base station based on the actual transmission rates and the measured SNR. The previous measurements of coupled load are fed to a statistical function that estimates the expected coupled load during the next scheduled transmission. The statistical function relies on the correlation that may, in some circumstances, be adaptively modified. The "blind" determination of the expected coupled load, within a certain margin, determines the available capacity available for the base station to schedule mobile stations served by the base station.

FIG. 1 is a block diagram of a communication system 100 providing wireless communication services to mobile stations 110, 112, 114 using geographically distributed base stations 102, 104, 106, 108 in accordance with the exemplary embodiments of the invention. FIG. 2 is a portion 200 of the communication system 100 where a single mobile station 202 is in communication with base stations (102–108) functioning as a serving base station 204 and non-serving base station 206 to the mobile station 202. At any particular time, a base station (102–108) may function as a serving base station 204 or a non-serving base station 206 to a particular mobile station (110–114) or may not perform any function directly for the mobile station (110–114). In the interest of clarity, four base stations 102, 104, 106, 108 and three mobile stations 110, 112, 114 are represented in FIG. 1. The communications system may include any number of base stations (102–108) and mobile stations (110–114) as well as other communication equipment. In the exemplary embodiments presented, the communication system 100 is a cellular communication system utilizing code division multiple access (CDMA) communication techniques to provide voice and data services. Those skilled in the art will readily recognize the various other types of communication systems 100 suitable for use with the invention by applying the teachings herein in accordance with known techniques.

Each base station 102, 104, 106, 108 provides wireless communication service to mobile stations (110, 112, 114) in a coverage region 116, 118, 120, 122 or cell. The coverage regions 116–120 overlap such that a mobile station 110–114 may be in communication with more than one base station 102–108 at any one time. If a mobile station 110–114 is within the coverage region of a base station 102–108, the mobile station 110–114 will identify the base station 102–108 as an active base station. As discussed in further detail below, however, only one base station (102–108) functions as a serving base station 204 to a particular mobile station 202 (110–114) for data communications. A serving base-station 204 is the base station responsible for scheduling the next transmissions of a mobile station 202. FIG. 1 includes exemplary shapes surrounding each base station 102–108 representing serving regions 116, 118, 120, 122 where the base station 102–108 is most likely to function as the serving base station 204 for the mobile stations 202 (110–114) within the serving region 116–122. Each mobile station 110–114 maintains a set of active base stations in memory where members of the set communicate through communication links that satisfy the required criteria. An example of a suitable method for selecting the active base stations (102–108) for a mobile station 110–114, 202 includes identifying a base station 102–108 as an active base station (102–108) 204, 206 when a signal transmitted from the base station 102–108 is received at the mobile station 110–114 at an adequate level. In the exemplary embodiments, the active base stations (102–108) 204, 206 are selected based on the received signal strengths of pilot signals transmitted from the base stations 102–108, 204, 206. In some circumstances, other techniques may be used to select the active base stations (102–108) 204, 206. The active base stations (102–108) 204, 206 provide communication service to a mobile station 110–114, 202 where the quality of service and data rate may vary between the base stations 102–108 due to various reasons.

In the exemplary embodiment, one of the active base stations (102–108) is selected as a serving base station 204 for the communication of data other than voice information. Any of several techniques and criteria may be used to select the serving base station 204. The serving base station 204 may be selected based on characteristics of the forward communication link 210 (from the base station 102–108 (204) to the mobile station 110–114 (202)), the reverse communication link 212 (from the mobile station 110–114 (202) to the base station 102–108 (204)) or on both the reverse and forward communication links 212, 210. The quality of the forward and reverse link channels 210, 212, for example, may be determined by measuring the carrier to interference ratio of the channel. In the exemplary embodiment, information contained in a reverse link channel quality indicator channel is used to identify the serving base station 204 and is identified by the R-CQICH channel. The serving base station 204 responds to the communications from the mobile stations 202 it is serving by performing various tasks such as allocating data transmissions rates via scheduling grants and maintaining reverse-link pilot received SNR above a threshold by sending power control commands. In addition, a serving base station 204 decodes the transmissions from the mobile station 202 and sends acknowledgements in case of hybrid-ARQ while a non-serving base station may also decode a transmission and send an ACK in case of a soft-handoff. The enclosed shapes representing the coverage regions in FIG. 1 define exemplary geographic serving regions 116–122 where mobile stations 110–114 within the region 116–122 will likely have adequate communication with the corresponding base station 102–108 to identify the particular base station 102–108 as the serving base station 204. Other base stations (102–108), however, may perform as active base stations (102–108) 206 to a mobile station 110–114, 202. As illustrated in FIG. 1, therefore, a first mobile station 110 is within a first serving region 116 provided by the first base station 102, a second mobile station 112 is within a second serving region 118 provided by the second base station 104, a third mobile station 114 is within a third serving region 129 provided by the third base station 106, and the fourth base station 108 provides a fourth serving region 122.

FIG. 3 is a block diagram of a base station 300 in accordance with an exemplary embodiment of the invention. The exemplary base station 300 is suitable for use as any one of the base stations 102–108, 204, 206 discussed with reference to FIG. 1 and FIG. 2. The base station 300 may include any combination of hardware, software, and firmware that performs the functions to the base stations 102–108. The functions and operations of the blocks described in FIG. 3 may be implemented in any number of devices, circuits, or software. Two or more of the functional blocks may be integrated in a single device and the functions described as performed in any single device or block may be implemented over several devices. For example, some receiving processes may be performed by the processor 304.

The base station includes a radio transceiver 302 configured to communicate with mobile stations 110–114 in accordance with the protocols of the particular communication system 100. Radio frequency signals are exchanged through the antenna 308 which may include sectors in some circumstances. The radio transceiver 302 modulates, amplifies, and transmits signals through the forward link channels 212 and receives and demodulates reverse link signals transmitted by the mobile stations 110–114 through the reverse link channels 210.

The processor 304 is any processor, microprocessor, computer, microcomputer, or processor combination suitable for performing the control and calculation functions of the base station 300 described herein as well as facilitating the overall functionality of the base station 300. Software code running on the processor 304 executes the steps of methods for measuring and processing signals and for performing the reverse link management functions of the exemplary embodiments.

A backhaul interface 306 provides an interface to the backhaul 208 of the communication system 100. The backhaul interface 306 includes hardware and software for exchanging signals through the backhaul 208. The processor 304 transmits and receives information to and from controllers and other base stations 102–108 through the backhaul interface 306.

FIG. 4 is a block diagram and FIG. 5 is table 500 illustrating an exemplary relationship between the mobile stations 110–114 and the base stations 102–108 in accordance with the exemplary embodiments of the invention. The solid lines connecting base stations 102–108 to mobile stations 110–114 in FIG. 4 represent a connection between mobile stations 202 (one of 110–114) and their corresponding serving base stations 204 (one of 102–108) and dashed lines represent connections between mobile stations 202 (one of 110–114) and their non-serving active base stations 206 (one of 102–108). As discussed herein, a non-serving active base station 206 (102–108) is a base station 300 identified in the set of active base stations of a mobile station 202 that is not a serving base station 204. In the exemplary situation illustrated in FIG. 4 and FIG. 5, each mobile station 110–114 maintains a set of active base stations that includes the serving base station 204 corresponding to the serving region 116–122 containing the mobile station 110–114 and all other base stations (102–108) that are non-serving active base stations (102–108). Accordingly, for the exemplary situation, all of the base stations 102–108 are maintained as active base stations by each of the mobile stations 110–114. A mobile station as a significant distance from a base station may not maintain the base station in the set of active base stations and the base station will not be identified as a non-serving base station to the mobile station even though the base station may receive reverse link interference from the mobile station. Only those mobile stations whose signal strength is strong enough and their transmissions processed are considered by a base-station. Focusing briefly on a single mobile station 110, the first base station 102 is the serving base station 204 for the first mobile station 110, 202, and the second base station 104, third base station 106 and fourth base station 108 are non-serving base stations 206 for the first mobile station 110, 202. The reverse link transmissions of each of the mobile stations 110–114, therefore, are received at each of the base stations 102–108 although only one of the base stations 102–108 that is performing as the serving base station 204 and the other base stations are performing as non-serving (active) base stations 206 for any particular mobile station 110–114 in this example. As a result, the reverse link loads and reverse link coupled loads experienced at a base station 102 are due to the reverse link loads of the mobile station 110 served by the base station 102 and the coupled loads resulting from transmission of other mobile stations 112, 114.

Figure 6:
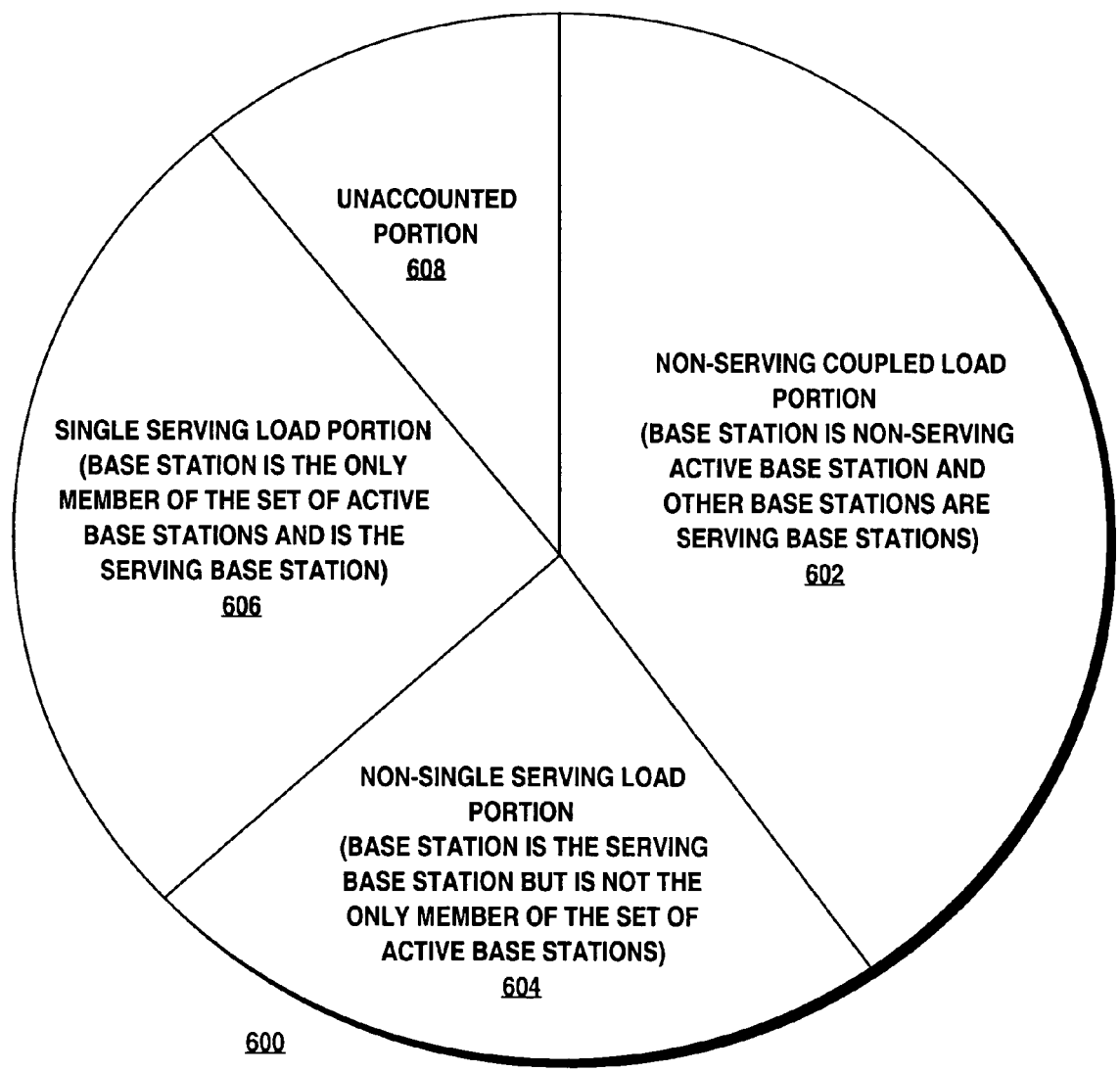
FIG. 6 is a graphical illustration of an exemplary distribution of reverse link loads and reverse link coupled loads experienced at a base station in accordance with the exemplary embodiments of the invention.

FIG. 6 is an illustration of a load pie chart 600 of an exemplary distribution of reverse link loads and reverse link coupled loads experienced at a base station 102–108 in accordance with the exemplary embodiments of the invention. The various sections 602–608 of the load pie chart represent the combined reverse link load resulting from mobile stations 110–114 that can be measured or simulated for an exemplary situation. At any base station 102–108, the total combined reverse link load may result from transmissions from mobile stations 110–114 where each portion (602–608) of the total reverse link load is due to mobile stations (110–114) in a particular category. The load portions (602–608) may include a non-serving coupled load portion 602, a serving non-single load portion 604, a serving single portion 606, and an unaccounted coupled load portion 608. The non-serving coupled load portion 602 includes the coupled reverse link load due to all of the mobile stations (110–114) that include the base station (102–108) within their set of active base stations but that are being served by base stations (102–108) other than the base station (102–108). The mobile stations 110–114 contributing to the non-serving coupled load portion 602, therefore, have not identified the base station (102–108) as the serving base station 204.

The non-single serving load portion 604 includes the combined reverse link load of all mobile stations 110–114 that are being served by the base station (102–108) but include other base stations (102–108) in their list of active base stations. The mobile stations 110–114 contributing to the non-single serving load portion 604, therefore, have identified the base station (102–108) as the serving base station but also have identified other base stations (102–108) as non-serving active base stations.

The single serving load portion 606 includes the combined reverse link load of all mobile stations served by the base station (102–108) where the base station (102,108) is the only base station in the set of active base stations of any of the mobile stations 110–114.

The unaccounted load portion 608 includes all other reverse link signals and noise that contribute to the total reverse link load that has not been included in any of the other load portions 602, 604, 606. An example of a source that may contribute to the unaccounted load portion 608 includes the reverse link transmissions from mobile stations that do not include the base station in their active set but are sufficiently close to the base station to contribute to total coupled load. Such mobile stations are too far to have an adequate communication link with the base station to include the base station in the set of active base station but the sum total of their insignificant contributions is large enough to take a share in the reverse-link capacity.

The relative size of the load portions 602–608 will vary over time in most situations because of the constantly changing channel conditions. The changing channel conditions may be due to several factors such as the motion of the mobile stations 110–114, the motion of obstacles, or the need to offload mobile stations 110–114 and to transfer mobile stations between base stations due to severely non-uniform distribution of mobile stations 110–114. When the combined load of all of the portions 602–608 exceeds the capacity of the base station 102–108, the quality of service (QoS) to the mobile stations suffers, the system becomes slightly unstable and coverage of the cell decreases leading to call drops. Where the load is less than the capacity of the base station 102–108, an inefficient use of resources can occur if the data rates are not adjusted in accordance with the requests of the mobile stations 110–114. In accordance with the exemplary embodiments, the reverse link communications are managed by the base stations 102–108 to efficiently allocate reverse link resources to (load schedule) the mobile stations 110–114. Reverse link resources include, for example, data rates and power levels that contribute to a load to the base station 102–108.

Figure 7:
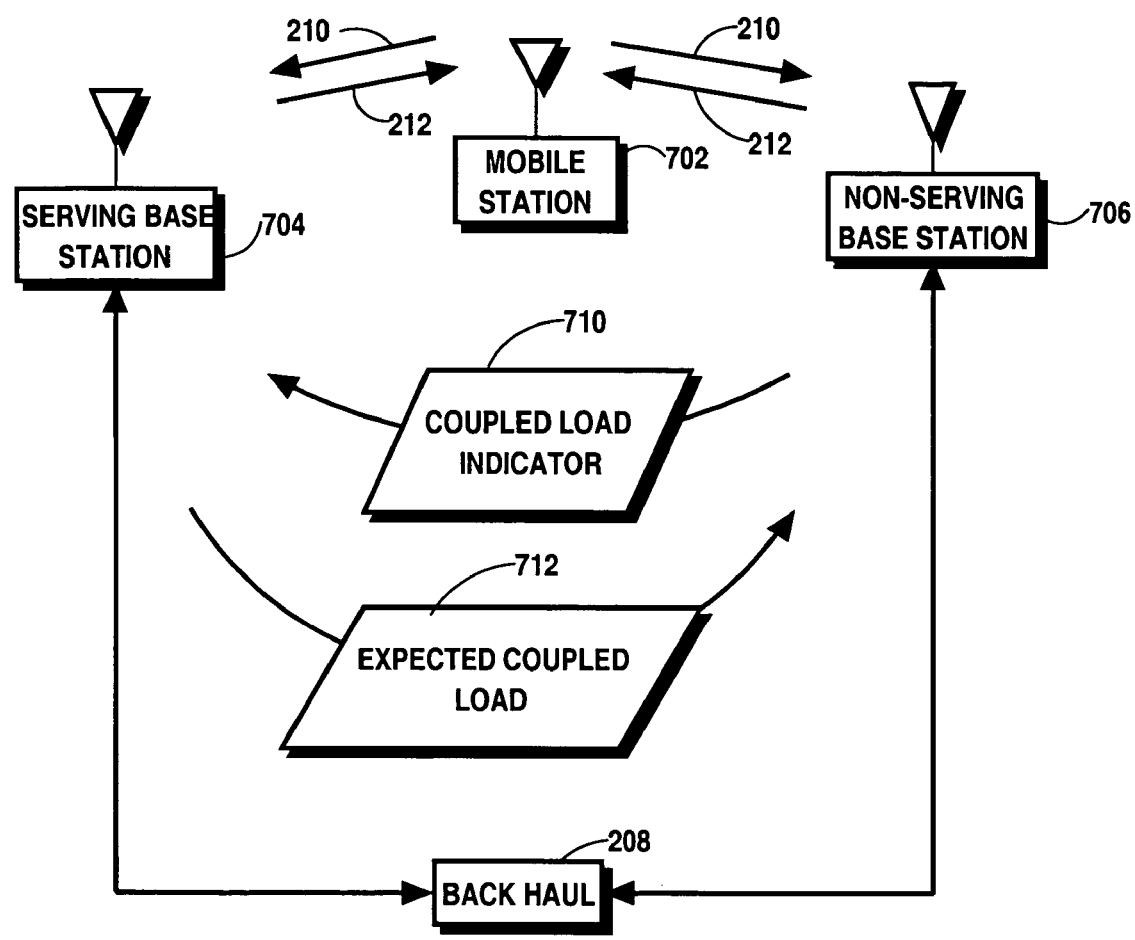
FIG. 7 is a block diagram of a portion of the communication system in accordance with the first exemplary embodiment of the invention.

FIG. 7 is a block diagram of a portion 700 of a communication system 100 providing communications services to mobile stations 110–114 with geographically distributed base stations 102–108 in accordance with the first exemplary embodiment of the invention. In most situations, the communication system 100 includes several base stations 704, 706 that are strategically positioned to provide wireless communication services to numerous mobile stations 702. Depending on the quality of the communication channels between a mobile station 702 and the base station (704,706), the mobile station 702 may be communicating with more than one base station (704, 706) at any particular time. As discussed above, each mobile station 702 maintains a set of active base stations where the communication links between the mobile station 702 and the active base stations 704, 706 are adequate for communication. Of the active base stations, one base station performs as the serving base station 704 while the other base stations in the active set are non-serving base stations 706. Such situations typically occur during a soft handoff where a single base station performs the functions of a serving base station 704 and one or more other base stations are non-serving active base stations 706. Where conditions warrant, the role of the serving base station 704 is transferred to a base station previously functioning as a non-serving active base station 706 (i.e. a handoff occurs).

In the interest of clarity, FIG. 7 includes blocks representing a mobile station 702 and two active base stations 704, 706 including a serving base station 704 and non-serving base station 706. Those skilled in the art will recognize, based on these teachings and known techniques, that a base station 300 may function as a serving base station 704 to numerous mobile stations 702 and that any one mobile station 702 may maintain any number of active base stations 704, 706. The teachings discussed herein, therefore, may be extended to any number of mobile stations 702, serving base stations 704, and non-serving base stations 706. As discussed below in further detail, the other base stations 300 may not have a communication link with the mobile station 702 of sufficient quality to become an active base station but may contribute to the load experienced at any one of the active base stations 704, 706. The serving base station 704 may be the first base station 102, the second base station 104, or third base station 106 discussed above with reference to FIGS. 1–4. The serving base station 704 may also function as a non-serving base station 706 for another mobile station (not shown in FIG. 7) and the non-serving base station 706 may function as a serving base station 704 for other mobile stations (not shown in FIG. 7). Accordingly, a base station 102–108 may simultaneously function as a serving base station 704 to some mobile stations 702 and as a non-serving base station to other mobile stations. The functions described herein for each of the base stations 704, 706, therefore, are simultaneously performed by the other of the base stations in most circumstances.

In the first exemplary embodiment, a base station 300 functioning as the non-serving base station 706 determines an expected available capacity based on an expected coupled load 712 received from another base station 300 functioning as the serving base station 704 where the expected coupled load 712 indicates an expected coupled load at the non-serving base station 706 resulting from reverse link transmissions 210 of a mobile station 702 being served by the serving base station 704. The serving base station 704 determines the expected coupled load 712 using the coupled load indicator 710 received from the non-serving base-station 706 and the parameters associated with the next scheduled data transmission rate. If there are multiple mobile stations 702 that are served by the serving base station 704 and that include the non-serving base-station 706 as a non-serving base station, the expected coupled load 712 can be the sum of expected coupled loads determined for each of the mobile stations based on the expected coupled load 712 and scheduled transmission data rates. The non-serving base station 706 receives and processes the reverse link transmissions 210 of the mobile station 702 to determine one or more coupled load parameters a such as a normalized and averaged receive signal-to noise ratio (SNR). An example of another coupled load parameter is a speed of the mobile station 702. Based on the coupled load parameters, the non-serving base station 706 calculates the coupled load indicator 710. The coupled load indicator 710 is forwarded to the serving base station 704. The serving base station 704 determines an expected coupled load at the non-serving base station 706 using the coupled load indicator 710 and a transmission parameter of the mobile station 702. The expected coupled load is the coupled reverse link load that will result at the non-serving base station 706 due to an anticipated future reverse link transmission of the mobile station 702. The serving base station 704 forwards a value representing the expected coupled load 712 to the non-serving base station 706. The non-serving base station 706 calculates the expected available capacity at the non-serving base station 706. Using the expected available capacity, the non-serving base station 706 manages the reverse link transmissions of other mobile stations (not shown) that are served by the non-serving base station 706 by appropriately load scheduling the mobile stations it is serving. Where there is more than one mobile station 702, the non-serving base station 706 measures and computes a coupled load indicator 710 for each mobile station 702 that maintains the non-serving base station 706 within the active set. A coupled load indicator 710 is forwarded to each serving base station 704 associated with the mobile stations 702 that identify the non-serving base station 706 as an active base station.

In the first exemplary embodiment, the coupled load indicator 710 is an energy-per-chip-to-noise-plus-interference ratio (Ecp/Nt), where Ecp represents the energy per pilot signal chip. If the reverse link pilot is power controlled, an average expected (Ecp/Nt) is computed by averaging chip (Ecp/Nt) over a particular duration. The coupled load indicator 710 may be the average expected (Ecp/Nt) or any function of the average expected (Ecp/Nt).

Although other methods may be used in some circumstances to forward the coupled load indicator 710 to the serving base station 704, the coupled load indicator 710 is transmitted through the backhaul 208 in the first exemplary embodiment. Accordingly, appropriate messaging and addressing is used to rout the coupled load indicator 710 through the backhaul 208. The backhaul interface 306 performs any required translations, or processing to exchange the coupled load indicators through the backhaul. In some circumstances, the coupled load indicator 710 can be transmitted through a direct communication link between the non-serving base station 706 and the serving base station 704. For example, a radio frequency or microwave point-to-point system link can be used to transmit coupled load indicator 710 in some situations. Further, in some circumstances, the coupled load indicator 710 may be conveyed through the mobile station 702.

In the first exemplary embodiment, the serving base station 704 identifies the mobile stations 702 that are expected to transmit during the next transmit cycle and generates the expected coupled load 712 based on the coupled load indicators 710 (for example Ecp/Nt) received from the non-serving base station 706 and the transmission data rate that the mobile station 702 has been authorized (scheduled) to use during the next transmission. The transmission parameter, therefore, at least includes the anticipated data rate of the mobile station 702 in the first exemplary embodiment. In addition, other transmission parameters may be used to calculate the expected coupled load at the non-serving base station 706, such as secondary pilot transmissions or control channels traffic-to-pilot ratio. In scenarios where the autonomous transmission on control and voice channels take place, the expected coupled load 712 may account for the average expected coupled load contributed by these channels. In the first exemplary embodiment, the expected coupled load 712 is some function of the expected Ecp/Nt that will be experienced by the non-serving base station 706 in the anticipated future transmission of the mobile station 702 and other transmission parameters including the scheduled transmission data rate. The serving base station 704 generates the expected coupled load 712 based on the coupled load indicator 710 and forwards the expected coupled load 712 to the non-serving base station 706. The expected coupled load 712, therefore, is based on the measured Ecp/Nt at the non-serving base station 704, the reverse link transmission power on control and voice channels, and the data rate on the traffic channel of the mobile station 702 in the first exemplary embodiment. The expected coupled load 712, however, may represent other values in some circumstances. For example, the expected coupled load 712 my represent an expected change in the coupled load that will be experienced at the non-serving base station as compared to a previous transmission.

Where the serving base station 704 is serving more than one mobile station 702 that has included at least one other non-serving base station 706 within the set of active base stations, the serving base station 704 generates an expected coupled load 712 for each non-serving base station 706 that has forwarded a coupled load indicator 710 to the serving base station 704. Accordingly, any particular base station 300 functioning as a non-serving base station 706 may receive an expected coupled load 712 from any number of base stations 300 functioning as serving base stations 704.

In the first exemplary embodiment, the expected coupled load 712 is transmitted through the backhaul 208 to the non-serving base station 704. The backhaul interface 306 performs the required processing and formatting to transmit the expected coupled load 712 through the backhaul 208 to the base station 300 functioning as the non-serving base station 704. In some situations, other techniques may be used to forward the expected coupled load 712.

After a base station 300 has received the expected coupled load 712 from all of the appropriate serving base stations 704 of mobile stations 702 contributing to the non-serving coupled load portion 602 of the total load, the non-serving base station 706 (300) determines the available capacity. The total of all of the expected coupled loads 712 is the expected non-serving coupled load portion of the total load at the base station 300. The available capacity is the difference of the total capacity of the non-serving base station 706 (300) and the total of the expected non-serving coupled load portion (402), and the unaccounted load portion 408. After taking into account loads due to voice or fundamental reverse channel traffic, the available capacity (CAV) at a base station 300 can therefore be expressed as:

$$CAV = CTOT - (LoadEx + LoadUA)$$

where CTOT is the total capacity of the cell after taking into account the loads due to voice and fundamental reverse channel traffic; LoadEx is the expected non-serving coupled load due to the mobile stations that are served by other base stations and for which the base station is included in the set of active base stations; and LoadUA is the load due to other sources.

Using the available capacity, the base station 300 functioning as a non-serving base station 706 for the mobile station 702 allocates reverse link resources (load schedules) the mobiles stations (not shown) that it is serving. In the exemplary embodiment, the non-serving base station 706 load schedules the mobile stations that do not have any other base stations in their active base station after allocating resources to the mobile stations maintaining other active base stations.

Figure 8:
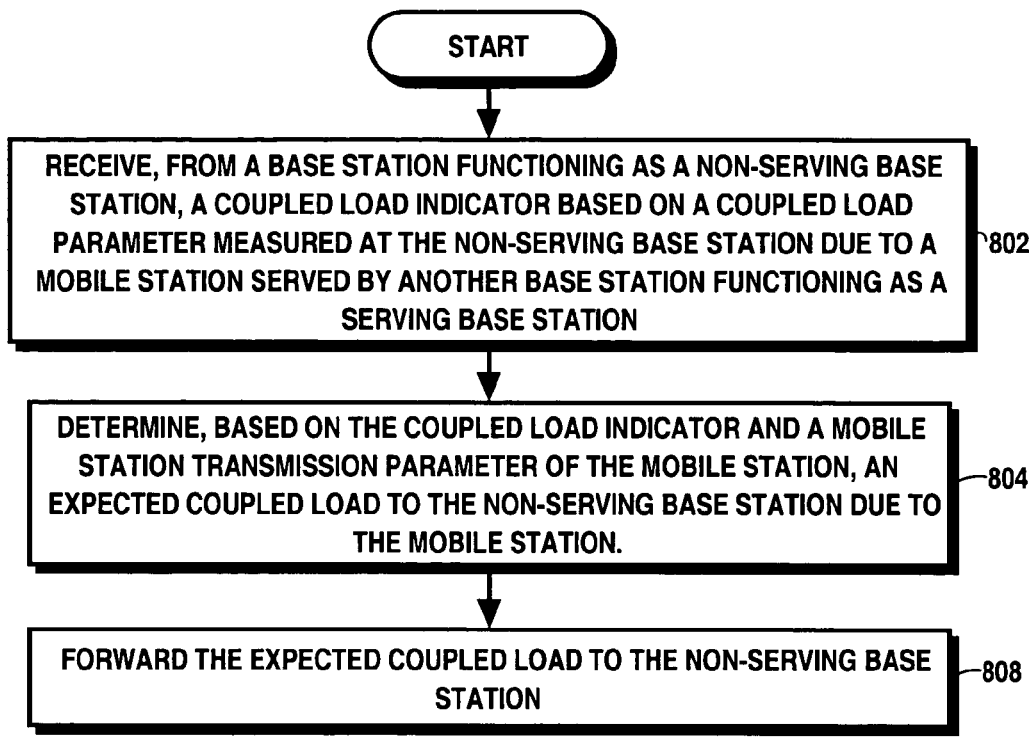
FIG. 8 is a flow chart of a method of determining an expected coupled load performed at a serving base station in accordance with the first exemplary of the invention.

FIG. 8 is flow chart of a method of determining an expected coupled load performed at a base station 300 functioning as a serving base station 704 to at least one mobile station 702 in accordance with the first exemplary of the invention. In some circumstances, the method discussed in FIG. 8 is performed in a base station 300 that is also functioning as a non-serving base station 706. The method described with reference to FIG. 8 is performed where at least one non-serving base station 706 is maintained in the set of active base stations of at least one mobile station 702 that is being served by the serving base station 704. The techniques discussed herein can be applied to any number of base stations 300 and mobile stations 110–114. In the exemplary embodiments, the methods are performed at least partially with software code running on the processor 304 within one or more base stations 300. Those skilled in the art will readily recognize the various techniques that can be sued to implement the methods discussed based on the teachings herein in accordance with known techniques.

At step 802, a coupled load indicator 710 is received from a base station 300 functioning as a non-serving base station 706 to at least one mobile station 702. The coupled load indicator 710 indicates the coupled load measured at the non-serving base station 706 due to the mobile station 702 served by another base station 300 functioning as the serving base station 704 to the mobile station 702. The non-serving base station 706 is included within the set of active base stations maintained by the mobile station 702. In the first exemplary embodiment, the coupled load indicator 710 represents the ECP/NT measured at the non-serving base station 706.

At step 804, the serving base station 704 determines an expected coupled load 712 at the non-serving base station 706 due to the mobile station 702 based on the coupled load indicator 710 and at least one transmission parameter. In the first exemplary embodiment, the serving base station 704 calculates the expected coupled load 712 for the mobile stations 702 that are expected to transmit on the next transmission based on the coupled load indicator 710 measured at the non-serving base station 706, the mobile station's scheduled data transmission rate for the future anticipated transmission, and the transmission power level of the mobile station 702. The expected coupled load, therefore, is the expected load to the non-serving base station 706 due to reverse link transmissions of the mobile station 702 that includes at least the serving base station 704 and the non-serving base station 706 in the mobile station's list of active base stations.

At step 806, the expected coupled load 712 is forwarded to the base station 300 functioning as the non-serving base station 706 to the mobile station 702. In the first exemplary embodiment, the expected coupled load 712 represents the expected loading as a function of the scheduled transmission data rate and the expected ECP/Nt level at the non-serving base station 706 due to a future anticipated transmissions of the mobile station 702. The expected coupled load 712, however, may represent other parameters or values. For example, the expected coupled load 712 may represent an anticipated change in the load experienced at the non-serving base station 706 due to the future transmission of the mobile station 702 as compared to a previous transmission. In the first exemplary embodiment, the expected coupled load indicator 712 is formatted to conform to the appropriate protocol and is transmitted through the backhaul 208 of the communication system 100. The expected coupled load indicator 712 may be forwarded to the non-serving base station 706 using other techniques. For example, a direct link communication link between the serving base station 704 and the non-serving base station 706, such as point-to-point microwave link, can be used to convey the expected coupled load.

Figure 9:
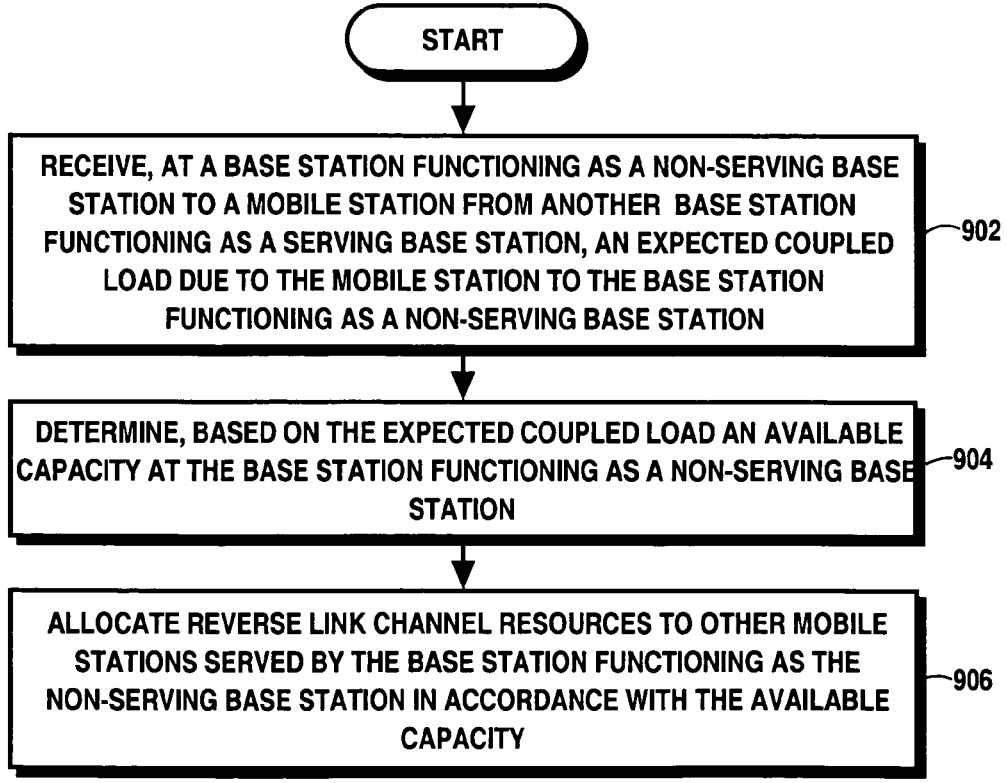
FIG. 9 is a flow chart of a method of determining an available capacity at a non-serving base station in accordance with the first exemplary embodiment of the invention.

FIG. 9 is a flow chart of a method of determining an available capacity at a base station 300 functioning as a non-serving base station 706 in accordance with the first exemplary embodiment of the invention. In some circumstances, the method discussed in FIG. 9 is performed in a base station 300 that is also functioning as a serving base station 704 to other mobile stations 110–114. The method described with reference to FIG. 9 is performed where the set of active base stations maintained at least at one mobile station 702 includes the non-serving base station 706 and a serving base station 704. The techniques discussed herein can be applied to any number of base stations 300 and mobile stations 110–114.

At step 902, an expected coupled load 712 is received from a base station 300 functioning as a serving base station 704 of a mobile station 702 that maintains a set of active base stations that includes at least the non-serving base station 706 and the serving base station 704. As discussed above, the expected coupled load 712 represents the expected coupled load that will likely be experienced at the non-serving base station 706 due to an anticipated future transmission of the mobile station 702.

At step 904, the base station 300 functioning as the non-serving base station 706 determines the available capacity at the non-serving base station 706 based on the expected coupled load 712. After taking into account the voice and non-scheduled reverse traffic data, the non-serving base station 706 determines the available capacity by calculating the difference between the total capacity and the sum of all loads and expected coupled loads. The remainder indicates the available capacity of the non-serving base station 706 that can be used for mobile stations 110–114 that the non-serving station 706 may be serving as a serving base station.

At step 906, the base station 300 functioning as the non-serving base station 706 allocates reverse link channel 212 resources (load schedules) mobile stations 110–114 served by the base station 300 functioning as the non-serving base station 706 to the mobile station 702 in accordance with the available capacity. The non-serving base station 706 allocates the available capacity by limiting power levels and data rates of any mobile stations 110–114 that are being served by the non-serving base station 706.

In the exemplary embodiment, the methods described with reference to FIG. 8 and FIG. 9 are performed within several geographically distributed base stations 300 where any of the base stations 300, at any time, may be functioning solely as a serving base station 704, solely as an non-serving base station 706, or as both a serving base station 704 for one or more mobile stations 110–114 and a non-serving base station 706 for one or more other mobile stations 110–114. Further, a mobile station 702 may maintain a set of active base stations that includes several non-serving base stations 706 in addition to the serving base station 704. Accordingly, in order to efficiently mange the reverse link loads at the various base stations 300, the coupled load indicators 710 and expected coupled loads 712 are conveyed to the appropriate base stations 300 and the calculations are performed taking into account the various parameters received from multiple base stations 300.

Figure 10:
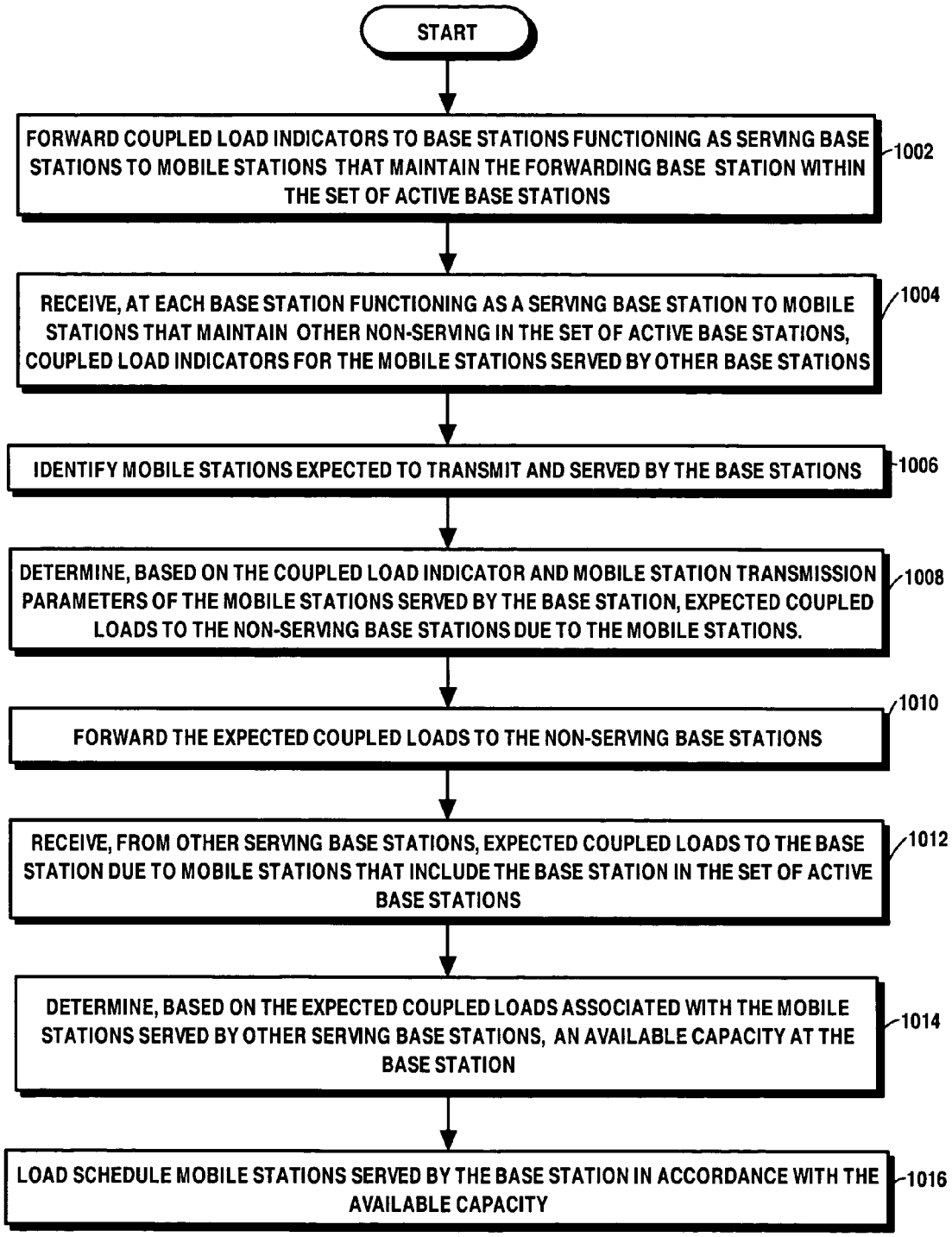
FIG. 10 is a flow chart of managing reverse link channel resources in the communication system in accordance with the first exemplary embodiment of the invention.

FIG. 10 is a flow chart of a method of allocating reverse link channel resources in a communication system 100 having geographically distributed base stations 300 in accordance with the first exemplary embodiment of the invention. As discussed above, the functions of serving base stations 704 and non-serving base stations 706 may be performed within a single base station 300 that functions as serving base station 704 to some mobile stations 110–114 and as a non-serving active base station 706 to other mobile stations 114.

At step 1002, the base stations 300 functioning as serving base stations 704 receive coupled load indicators 710 measured at base stations 300 functioning as non-serving base stations 706 where the coupled loads are due to the reverse link transmissions from mobile stations 702 served by the serving base stations 704 and that maintain a set of active base stations that include the one or more of the non-serving base stations 706. Each non-serving base station 706 generates a coupled load indicator 710 that, along with the rate of transmission, represents the measured coupled load at the non-serving base station 706 due to the mobile stations that are served by another base station 300. The coupled load indicators 710 are transmitted by the non-serving base stations 706 to the corresponding serving base station 704 through the backhaul 708.

A suitable notation for characterizing and describing relationships between the various base stations 300, 704, 706 includes using subscripts to denote a set of base stations. In the first exemplary embodiment, each base station (BS j) that is in the active set of mobile stations (MSi), except where BS j∈ ServingBS_MS$_i$, measures and transmits the (Ecp/Nt)ji to the serving base station for MSi. In the first exemplary embodiment, (Ecp/Nt)ji is used as a coupled load indicator. ServingBS_MSi is the set of serving base stations for mobile stations (i) and (Ecp/Nt)ji(1+(T/P)(Ri)+(C/P))/(1+(Ecp/Nt)ji(1+(T/P)(Ri)+(C/P))) is the coupled load experienced at the non-serving base stations (BSj) due to mobile stations (MSi) served by the serving base stations. (T/P)(Ri) is the traffic-to-pilot ratio of the traffic channel when the transmission rate is Ri. (C/P) is the sum total of control channels (and fundamental channels) power to pilot power ratios. In the exemplary embodiment, a value representing the (Ecp/Nt)ji is transmitted to the serving base stations (BSk).

At step 1004, each serving base station 704 identifies the mobile stations 702 served by the serving base station 704 and expected to transmit during a future transmission period. For each base station (BSk), the BSk determines a set (FSk) that includes the mobile stations that are served by BSk and have a priority exceeding a minimum priority.

At step 1006, each serving base station 704 determines expected coupled loads 712 to the non-serving base stations 706 due to the mobile stations 702 that the serving base station 704 is serving. The serving base station 704 determines the coupled load for each of the mobile stations 702 that are anticipated to transmit (i.e. that are members of set FSk) based on the received coupled load indicators 710 received at the serving base stations 704 and transmission parameters of the mobile stations 702. Accordingly, the BSk determine the expected coupled loads for all MSi in FSk in other BSj, where these BS j∉ServingBS_MS$_i$:

$$CoupledLoad_{kj}(R_i, (E_{cp}/N_t)_{ji}) = \sum_{\substack{i \in FS_k \\ j \in ActiveSet(i)}} \frac{Sinr_{ji}(R_i(C/P))}{1+Sinr_{ji}(R_i, (C/P))} - \sum_{\substack{i \in FS_k \\ j \in ActiveSet(i)}} \frac{Sinr_{ji}(0, (C/P))}{1+Sinr_{ji}(0, (C/P))}$$

where CoupledLoadkj is the total coupled load experienced at BSj due to MSi served by BSk, $Sinr_{ji}(R_i, E[R_{FCH}])$ is the estimated signal to interference ratio if the MSi is assigned a rate Ri on R-SCH and $E[R_{FCH}]$) is the sum total of control channels (including fundamental voice channel and secondary pilot channel) power to pilot channel power. $Sinr_{ji}(R_i,(C/P))$ is related to (Ecp/Nt)ji according to the following equation:

$$Sinr_{ji}(R_i,(C/P))=(E_{cp}/N_t)_{ji}(1+(T/P)(R_i)+(C/P))$$

where (T/P)(R$_i$) is the traffic-to-pilot power ratio when the transmission rate on the traffic channel scheduled by serving base station is R$_i$.

At step 1008, each of the serving base stations 704 forwards the expected coupled load (CoupledLoadkj) to the non-serving base stations 706. The expected coupled loads 712 represent the expected coupled loads calculated by the serving base stations 704. Each base station (BSk) forwards CoupledLoadkj to all other base stations. In the exemplary embodiment, the expected coupled loads 712 are transmitted through the backhaul 208.

At step 1110, each base station 300 functioning as a non-serving base station 706 to at least one mobile station 702 and receiving an expected coupled load 712 determines an available capacity of the non-serving base station 706 based on the expected coupled load 712. Since each of the non-serving base stations 706 may be a serving base station 704 for other mobile stations, each serving base station 704 receives a coupled load indicator from other serving base stations 704 if the particular serving base station 704 is also a non-serving base station 706. Accordingly, each non-serving base station 706 of BSk receiving a CoupledLoadjk determines the available capacity at the BSk using the expression:

$$CoupledinLoad_k = \sum_{\substack{j, j \neq k \\ j \in BS(k)}} CoupledLoad_{jk}$$

$$Cav_k = Cav\_base_k - CoupledinLoad_k$$

where CoupledinLoadk is the sum of the coupled loads received from the other serving base stations 704, and Cavk is the available capacity at the serving base station 704 after taking into account all other load contributions from voice and fundamental reverse channel data traffic.

At step 1012, the serving base stations 704 that are also functioning as non-serving base stations 706 allocate reverse link channel resources to the mobile stations 110–114 (i.e. load schedules mobile stations) in accordance with the available capacity for the serving base station 704. In the first exemplary embodiment, therefore, each serving base station 704 that is also non-serving base stations 706, load schedules the mobile stations MSi that are served by the serving base station 704 that also maintain other active base stations according to the following equations:

$$CoupledoutLoad_k = \sum_{\substack{j \\ j \in BS(k)}} CoupledLoad_{kj}$$

$$Cav_k = Cav_k - CoupledoutLoad_k$$

where CoupledoutLoadk is the scheduled load of all of the mobile stations with multiple base stations in the active set but served by serving base station. CoupledoutLoadkj is same as CoupledinLoadkj that was forwarded by BSk to the BSj. In accordance with the remaining available capacity after scheduling the mobile, the serving base stations BSk allocate the reverse channel resources to the mobile stations that maintain only the serving base station as the only active base station.

Therefore, in accordance with the first exemplary embodiment of the invention, each base station 300 that is a member of a set of active base stations of a mobile station 702 measures and forwards the coupled loads due to those mobile stations 702 served by other base stations 704 to the serving base stations 704 of the mobile station 702. Each serving base station 704 calculates an expected coupled load 712 for those mobile stations 702 served by the calculating base station 704 and maintaining other active base stations. Each serving base station 704 calculates an available capacity based on the expected coupled loads received from other base stations 300 that are functioning as serving base stations 704 to other mobile stations. Accordingly, each base station 300 determines the available capacity based on the expected coupled loads calculated by the other base stations that are serving the mobile stations that contribute to the total load at the base station 300. Resources are efficiently allocated without the use of a central controller thereby minimizing delays and reducing the likelihood of retransmissions and lost data.

Figure 11:
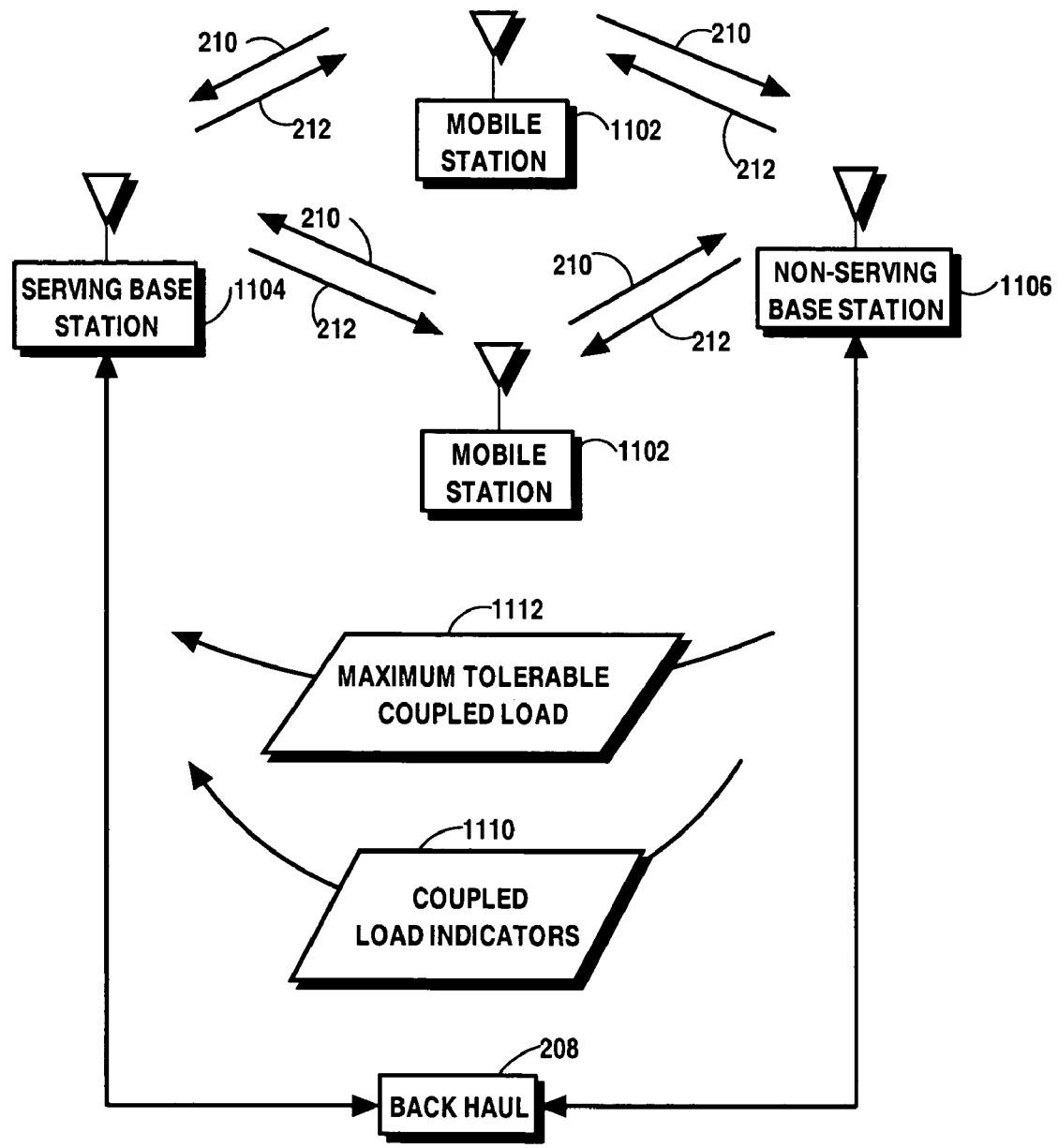
FIG. 11 is a block diagram of a portion of the communication system in accordance with a second exemplary embodiment of the invention.

FIG. 11 is a block diagram of a portion 1100 of a communication system 100 in accordance with the second exemplary embodiment of the invention. In the interest of clarity, FIG. 11 includes blocks representing two mobile stations 1102 and two active base stations 1104, 1106 including a serving base station 1104 and a non-serving active base station 1006. Those skilled in the art will recognize based on these teachings and known techniques that a base station may function as a serving base station 1104 to numerous mobile stations 1102 and that any one mobile station 1102 may maintain any number of active base stations 1104, 1106. The teachings discussed herein, therefore, may be extended to any number of mobile stations 1102, serving base stations 1104, and non-serving base stations 1006. The serving base station 1104 may be the first base station 102, the second base station 104, or third base station 106 discussed above with reference to FIGS. 1–4. The serving base station 1104 may also function as an active non-serving base station 1106 for another mobile station (not shown in FIG. 11) and the non-serving base station 1106 may function as a serving base station for other mobile stations (not shown in FIG. 11). Accordingly, a base station may simultaneously function as a serving base station 1104 to some mobile stations and as a non-serving active base station 1106 to other mobile stations 1102. The functions described herein for each of the base stations 1104, 1106, therefore, are simultaneously performed by the other of the base stations 1104, 1106 in most circumstances.

In a second exemplary embodiment, a base station 300 functioning as a non-serving base station 1106 determines the maximum tolerable coupled load for mobile stations 1102 served by another base station functioning as the serving base station 1104. Based on the total capacity of the non-serving base station 1106 and the load due to other mobile stations (not shown) served by the non-serving base station 1106, the non-serving base station 1106 determines a maximum tolerable coupled load due to mobile station 1102 not served by the non-serving base station 1106. In the second exemplary embodiment, the non-serving base station 1106 reserves capacity for the mobile stations that have some other base station 1104 as serving base station. The non-serving base station 1106 determines the maximum tolerable coupled load that the mobile stations 1102 served by base station 1104 can contribute to the total load at the non-serving base station 1106. The non-serving base station 1106 then forwards the sum total of maximum tolerable coupled loads 1112 for all mobile stations 1102 served by the serving base station 1104 that maintain the non-serving base station 1106 in their set of active base stations. The non-serving base station 1106 determines a coupled load indicator for each mobile station 1102. The coupled load indicators 1110 represent the measured traffic quality estimate at the non-serving base stations due to the reverse links transmissions of the mobile stations 1102. In CDMA systems with a power-controlled pilot channel, a long term averaged and expected pilot SNR is a suitable coupled load indicator. The serving base station 1104 allocates reverse link resources to the mobile stations 1102 in accordance with the maximum tolerable coupled load. In the second exemplary embodiment, the serving base station 1104 allocates reverse link resources in accordance with two sets of constraints. The first set of constraints is imposed by the capacity of the serving base station 1104 and requires that the transmission data rate allocated to the mobile stations 1102 should create a load at the serving base station 1104 that is less than the available capacity at the serving base station 1104. The second set of constraints is imposed by the maximum tolerable coupled load 1112 reported by the non-serving base stations 1104. The rate allocated by the serving base station 1104 to all the mobile stations 1102 with non-serving base station 1106 in their active set should create a load at the non-serving base station 1106 that is less than the maximum tolerable coupled load. The coupled load indicators 1110 and the allocated transmission data rate determine the expected load contributed by the mobile station 1102 at the non-serving base station 1104.

Figure 12:
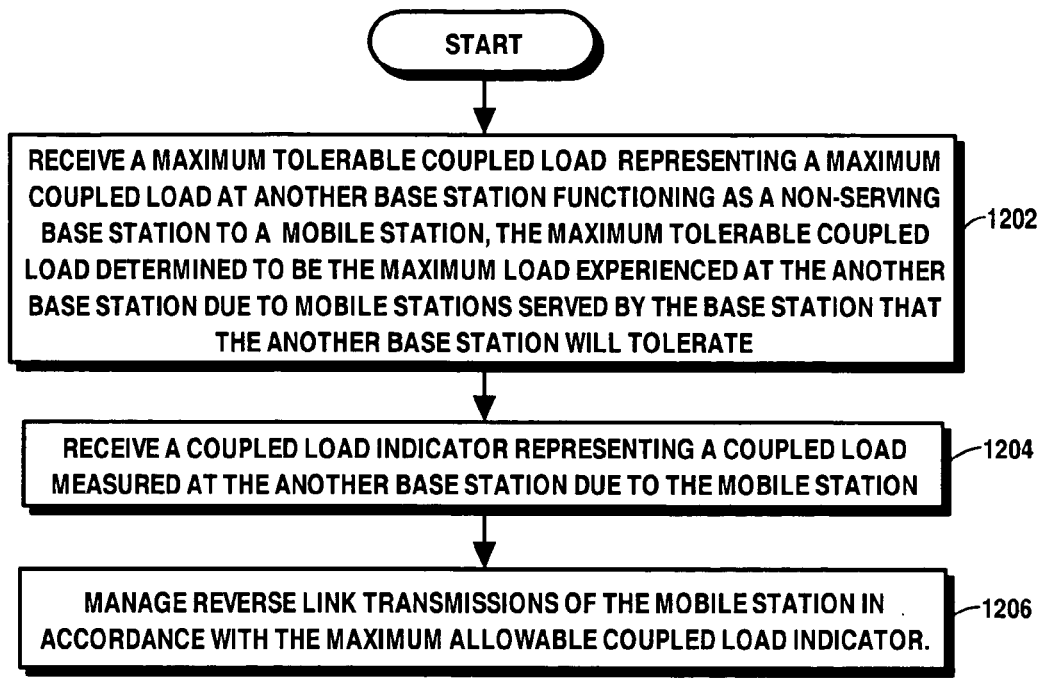
FIG. 12 is a flow chart of a method of managing reverse link channels performed in a base station functioning as a serving base in accordance with the second exemplary embodiment of the invention.

FIG. 12 is a flow chart of a method of managing reverse link channels performed in a base station 300 functioning as a serving base in accordance with the second exemplary embodiment of the invention. In some circumstances, the method discussed in FIG. 12 is performed in a base station 300 that is also functioning as a non-serving base station 1106. The method described with reference to FIG. 12 is performed where at least one non-serving base station 1106 is maintained in the set of active base stations of at least one mobile station 1102 that is being served by the serving base station 1104. The techniques discussed herein can be applied to any number of base stations 300 and mobile stations 1102.

At step 1202, a base station 300 functioning as the serving base station 1104 receives a maximum tolerable coupled load 1112 representing a maximum tolerable coupled load at another based station 300 serving as a non-serving base station 1106 to a mobile station 1102. The maximum tolerable coupled load 1112 is determined by the non-serving base station 1106 based on priority and service rate requests of mobile stations served by the non-serving base station 1106.

At step 1204, a coupled load indicator 1110 is received at the serving base station 1104. In the exemplary embodiment, the coupled load indicator 1110 is based on coupled load parameters measured at the non-serving base station 106 and represents a quality of the traffic channel measured at the non-serving base station 1106 due to the reverse link transmissions 210 of the mobile station 1102 served by the serving base station 1104.

At step 1206, the serving base station 1104 manages the reverse link transmissions of the mobile station 1102 in accordance with the maximum tolerable coupled load 1112. In the exemplary embodiment, the serving base station 1104 calculates the expected coupled loads of all mobile stations 1102 maintaining the non-serving base station 1106 in their set of active base stations. Using the coupled load indicator 1110 for each mobile station 1102 and the mobile station transmission parameter of each mobile station 1102, the serving base station 1104 calculates the expected coupled load for the mobile station 1102. The serving base station 1104 schedules data transmission rates to the mobile stations 1102 such that the total expected coupled load at the non-serving base station 1106 will not exceed the maximum tolerable coupled load 1112 during a future transmission. Accordingly, the serving base station 1104 allocate resources to the mobile stations 1102 while conforming to the limits provided by the non-serving base stations 1106 thereby minimizing the likelihood of an overload condition at the non-serving base stations 1106.

Figure 13:
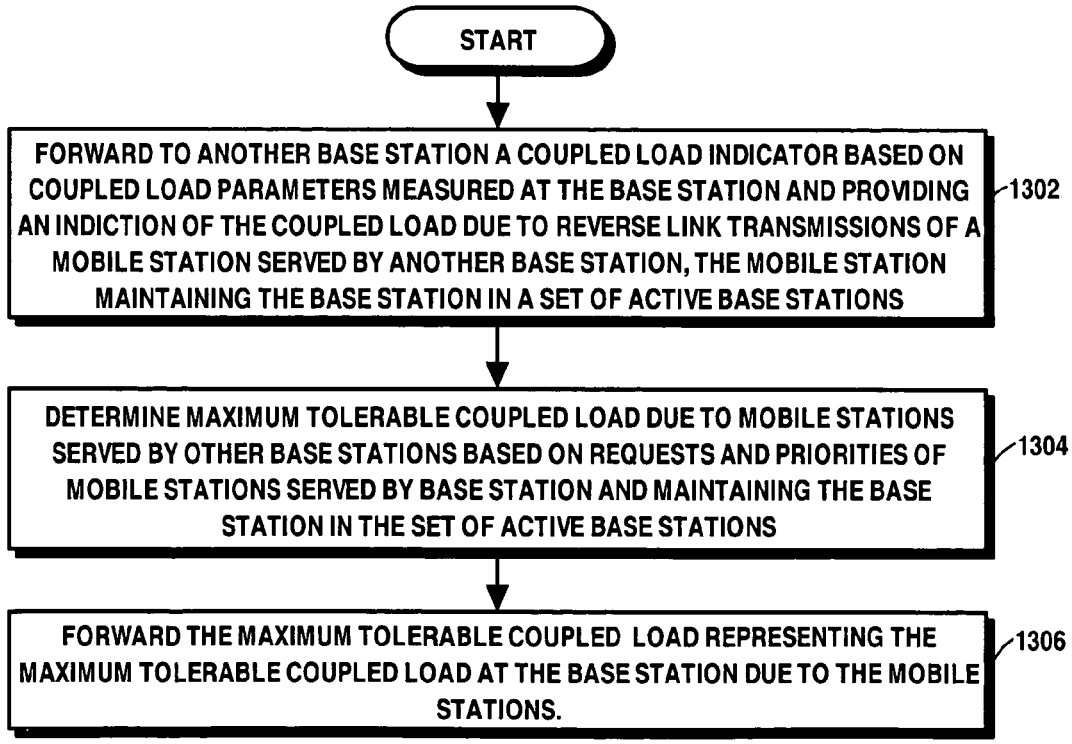
FIG. 13 is a flow chart of a method of managing reverse link channel resources at a base station functioning as a non-serving base station in accordance with the second exemplary embodiment of the invention.

FIG. 13 is a flow chart of a method of managing reverse link channel resources at a base station 300 functioning as a non-serving base station 1106 in accordance with the second exemplary embodiment of the invention.

At step 1302, the base station 300 functioning as non-serving base station 1106 to the mobile station 1102 forwards, to another base station 300 functioning as a serving base station 1104 to the mobile station 1102, a coupled load indicator 1110 based on coupled load parameters measured at the non-serving base station 1106 due to reverse link transmissions of the mobile station 1102.

At step 1304, the non-serving base station 1106 determines the maximum tolerable coupled load. Various mobile stations rate requests are arranged in decreasing order of their priorities. After the mobile stations with higher priorities are assigned capacity, the mobile stations 1102 are assigned a capacity such that some fraction of maximum tolerable coupled load is equal to the capacity set aside for the mobile stations 1102.

At step 1306, a maximum tolerable coupled load 1112 representing the maximum allowable load is forwarded to the base station 300 functioning as the serving base station. In the second exemplary embodiment the maximum tolerable coupled load 1112 is transmitted through the backhaul 208 to the serving base station 1104.

Figure 14:
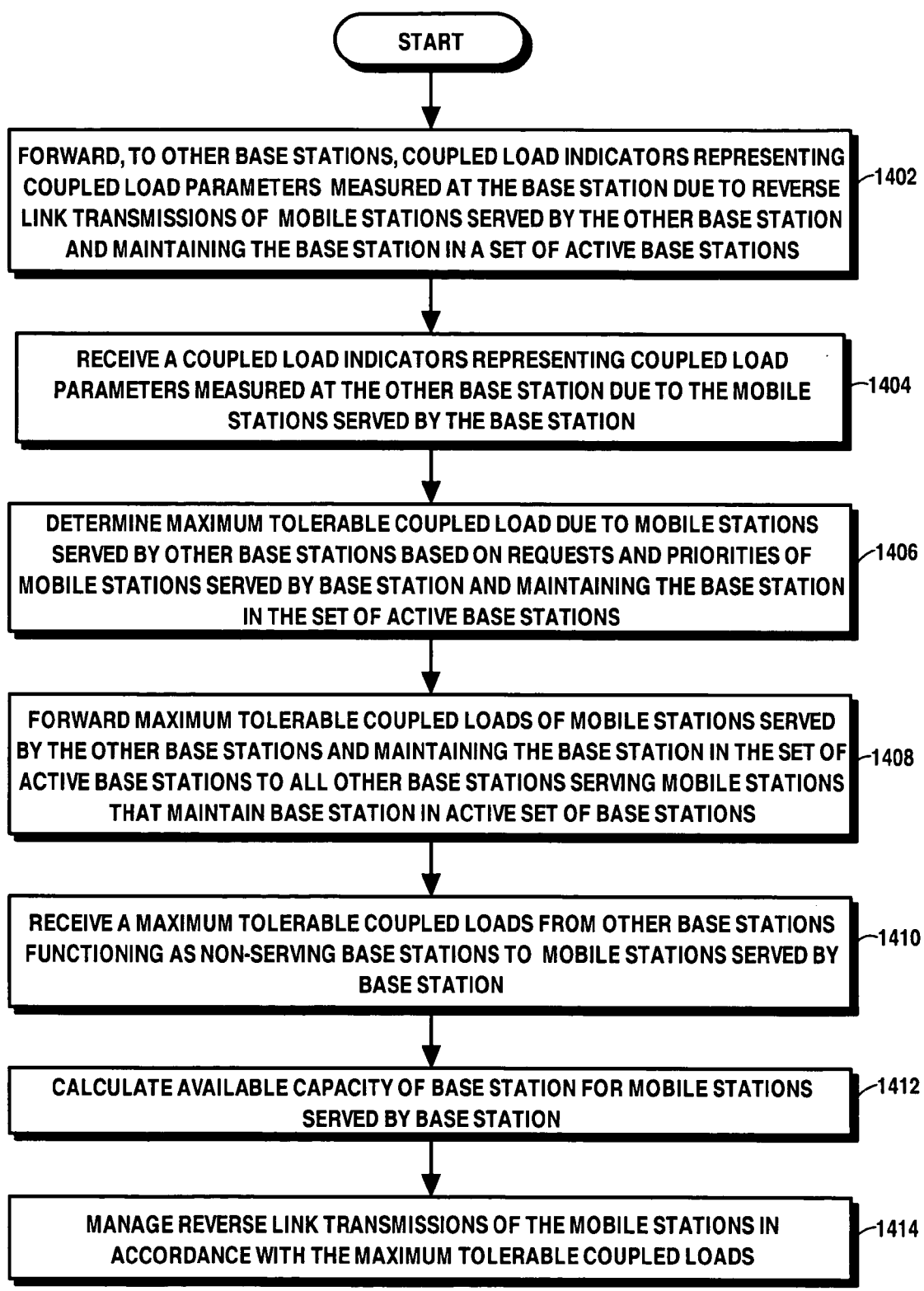
FIG. 14 is a flow chart of a method of allocating reverse link channel resources in a communication system having geographically distributed base stations in accordance with the second exemplary embodiment of the invention.

FIG. 14 is a flow chart of a method of allocating reverse link channel resources in a communication system 100 having geographically distributed base stations in accordance with the second exemplary embodiment of the invention. As discussed above, the functions of serving base stations 1104 and non-serving base stations 1106 may be performed within a single base station 300 that functions as serving base station 1104 to some mobile stations 110–114 and as a non-serving active base station 1106 to other mobile stations 114.

At step 1402, all base stations that are maintained in an active list of a mobile station 1102 that is served by another base station forward a coupled load indicator 1110 to the other base stations 1104 that are serving the mobile stations 1102. The coupled load indicators 1110 are based on coupled load parameters measured at the base station 1106. In the second exemplary embodiment, the base station 1106 measures and forwards the Ecp/Nt values due to the reverse link transmissions of mobile stations 1102 served by the other base stations 1104 and that maintain the base station 1106 in the set of active base stations.

A suitable notation for characterizing and describing relationships between the various base stations 300, 1104, 1106 includes using subscripts to denote a set of base stations. In the second exemplary embodiment, each base station (BS j) that is in the active set of mobile stations (MSi), except where BS j∈ ServingBS_MS$_i$, measures and transmits the (Ecp/Nt)ji to the serving base station for MSi. In the second exemplary embodiment, (Ecp/Nt)ji is used as a coupled load indicator 1110. ServingBS_MSi is the set of serving base stations for mobile stations (i) and (Ecp/Nt)ji $(1+(T/P)(Ri)+(C/P))/(1+(Ecp/Nt)ji(1+(T/P)(Ri)+(C/P)))$ is the coupled load experienced at the non-serving base stations (BSj) due to mobile stations (MSi) served by the serving base stations. (T/P)(Ri) refers to the traffic-to-pilot ratio of the traffic channel when the transmission rate is Ri. (C/P) refers to the sum total of control channels (and fundamental channel) power to pilot power ratio. In the exemplary embodiment, a value representing the (Ecp/Nt)ji is transmitted to the serving base stations (BSk).

At step 1404, the base stations 300 functioning as serving base stations 1104 receive coupled load indicators from base stations 1106 maintained in the set of active base stations by mobile stations served by the base stations 1104.

At step 1406, the base stations determine a maximum tolerable coupled load 1112 due to mobile stations served by other base stations based on the requests and priorities of mobile stations served by the base stations. A scheduler function in each base station j functioning as a non-serving base station reserves the maximum tolerable coupled load capacity 1112 (MaxTolerableCoupledLoad jk) for mobile stations served by other base stations.

At step 1408, the base stations forward the maximum tolerable coupled load to the other base stations. Accordingly, each base station functioning as a non-serving base station forwards the maximum tolerable coupled load capacity 1112 (MaxTolerableCoupledLoad jk) to the serving base stations k.

At step 1410, base stations functioning as serving base stations receive the maximum tolerable coupled loads 1102 from non-serving base stations 1106 maintained in the set of active base stations of mobile stations 1102 served by the base stations.

At step 1412, the base stations calculate the available capacity at the base station for mobile stations served by the base stations functioning as a non-serving base station 1106 to some mobile stations and as a serving base station 1104 to other mobile stations. After reserving capacity for all mobile stations 1102 served by other base stations, base stations functioning as the non-serving base-stations j calculate their available capacity according to the following equation:

$$Cav_j = Cav_j - f \times \sum_k MaxTolerableCoupledLoad_{jk},$$

where $Cav_j$ is the available capacity at the non-serving base station j for scheduling the mobile stations for which the base station j is the serving base station. The factor f represents how conservative the base station j is in reserving capacity for the mobile stations it is not responsible for scheduling. f=0 represents the case where the base station j doesn't reserve any capacity for the mobile stations it is not scheduling while f=1 represents the case where base station j is most conservative.

At step 1414, the base stations manage reverse link transmissions by allocating reverse links resources in accordance with the maximum tolerable coupled loads 1112 received from other base stations. In the second exemplary embodiment, the base stations k allocate reverse link resources by allocating transmission data rates to all mobile stations i served by base stations k in accordance with the following criteria:

$$\sum_{\substack{i: k \in ServingBS(i) \\ : j \in ActiveBS(i)}} CoupledLoad_{jk}\left(R_i, (E_{cp}/N_t)_{ij}\right) <$$

$$MaxTolerableCoupledLoad_{jk} \frac{Sinr_{ki}(R_i, (C/P))}{1 + Sinr_{ki}(R_i, (C/P))} \le Cav_k$$

where CoupledLoad and Sinr are as defined above with reference to the first exemplary embodiment.

Accordingly, each base station determines the coupled loads at the base station due to mobile stations served by other base stations, reserves capacity for those mobile stations, forwards the maximum tolerable coupled loads to all serving base stations serving those mobile stations, and allocates reverse link resources based on the available capacity for mobile stations the base station is serving and the maximum tolerable coupled loads received from non-serving base stations of the mobile stations served by the base station.

Figure 15:
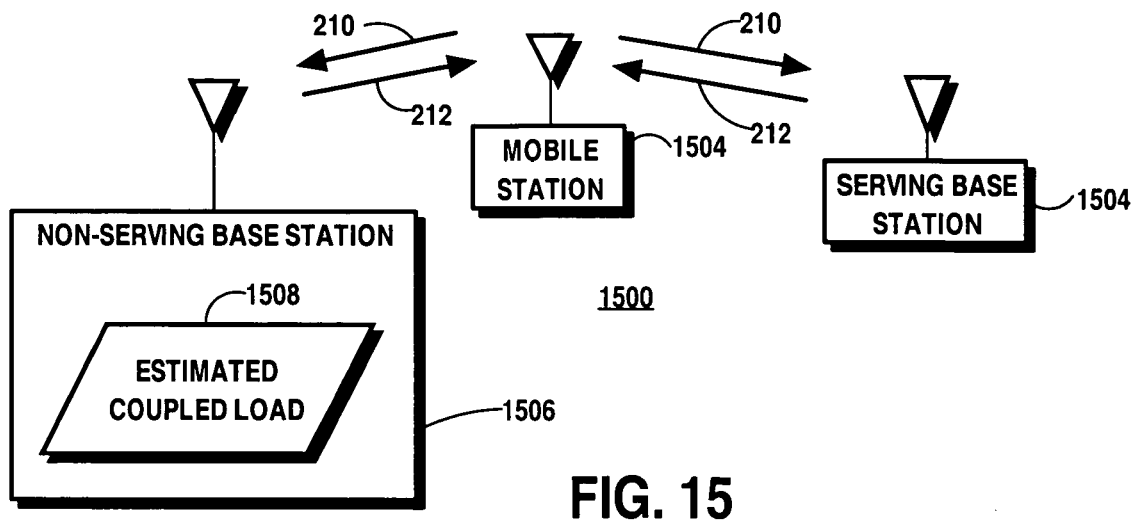
FIG. 15 is a block diagram of a portion of a communication system providing communications services to mobile stations with geographically distributed base stations in accordance with the third exemplary embodiment of the invention.

FIG. 15 is a block diagram of a portion 1500 of a communication system 100 providing communications services to mobile stations 110–114 with geographically distributed base stations 102–108 in accordance with the third exemplary embodiment of the invention. In most situations, the communication system 100 includes several base stations 1504, 1506 that are strategically positioned to provide wireless communication services to numerous mobile stations 1502. Depending on the quality of the communication channels between a mobile station 1502 and the base station (1504, 1506), the mobile station 1502 may be communicating with more than one base station (1504, 1506) at any particular time. As discussed above, each mobile station 1502 maintains a set of active base stations where the communication links between the mobile station 1502 and the active base stations 1504, 1506 are adequate for communication. Of the active base stations, one base station performs as the serving base station 1504 while the other base stations in the active set are non-serving base stations 1506. Such situations typically occur during a soft handoff where a single base station performs the functions of a serving base station 1504 and one or more other base stations are non-serving active base stations 1506. Where conditions warrant, the role of the serving base station 1504 is transferred to a base station previously functioning as a non-serving active base station 1506 (i.e. a handoff occurs).

In the interest of clarity, FIG. 15 includes blocks representing a mobile station 1502 and two active base stations 1504, 1506 including a serving base station 1504 and non-serving base station 1506. Those skilled in the art will recognize, based on these teachings and known techniques, that a base station 300 may function as a serving base station 1504 to numerous mobile stations 1502 and that any one mobile station 1502 may maintain any number of active base stations 1504, 1506. The teachings discussed herein, therefore, may be extended to any number of mobile stations 1502, serving base stations 1504, and non-serving base stations 1506. As discussed below in further detail, the other base stations 300 may not have a communication link with the mobile station 1502 of sufficient quality to become an active base station but may contribute to the load experienced at any one of the active base stations 1504, 1506. The serving base station 1504 may be the first base station 102, the second base station 104, or third base station 106 discussed above with reference to FIGS. 1–4. The serving base station 1504 may also function as a non-serving base station 1506 for another mobile station (not shown in FIG. 15) and the non-serving base station 1506 may function as a serving base station 1504 for other mobile stations (not shown in FIG. 15). Accordingly, a base station 102–108 may simultaneously function as a serving base station 1504 to some mobile stations 1502 and as a non-serving base station to other mobile stations. The functions described herein for each of the base stations 1504, 1506, therefore, are simultaneously performed by the other of the base stations in most circumstances.

In the third exemplary embodiment, a base station 300 functioning as a non-serving base station 1506 estimates an expected coupled load 1508 due to mobile stations 1502 served by other base stations 1504 and allocates reverse link resources in accordance with the expected coupled load 1508. Accordingly, no direct or explicit communication is sent over a backhaul 208 between the serving base station 1504 and the non-serving base station 1506 in the third exemplary embodiment of the invention. The serving base station 1504 schedules all mobile stations 1502 it is serving based on the channel quality of the traffic channel received at the serving base station 1504.

The non-serving base station 1506, schedules the mobile stations (not shown) served by the non-serving base station 1506 after making an estimate of the expected coupled load 1508 contributed by all the mobile stations 1502 it is not scheduling (i.e. serving) but that are transmitting reverse link signals 210 that are received and processed by the non-serving base station 1506. In some circumstances, the estimations of the expected coupled loads 1508 by the non-serving base stations 1506 are based on the measurements made of previous transmissions of mobile stations 1502 in a soft-handoff with the non-serving base station 1506. The estimation includes the total expected coupled loads from all mobile stations 1502 for which 1506 is a non-serving base station 1506 and that are served by any other base station.

Figure 16:
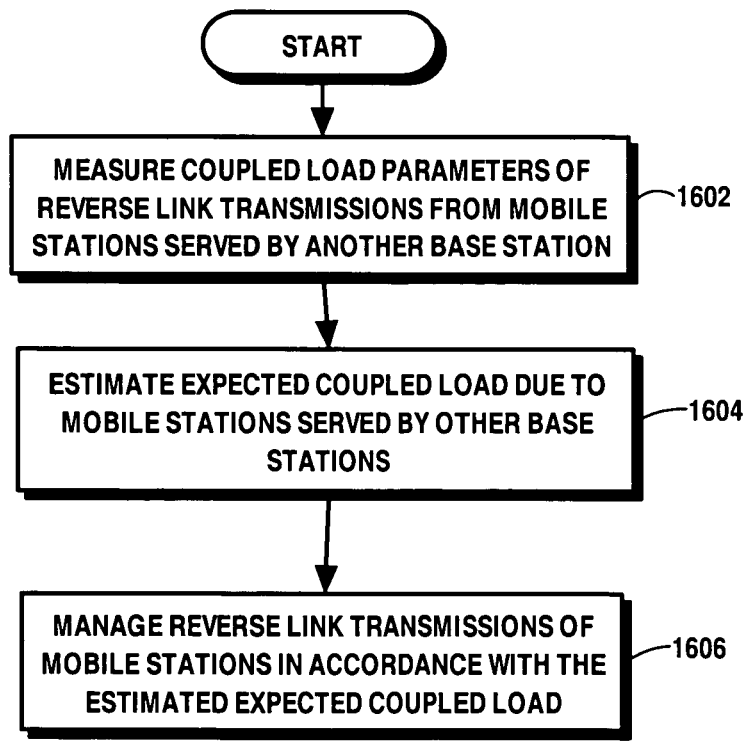
FIG. 16 is a flow chart of a method, performed in a base station, of managing reverse link resources in a communication system having geographically distributed base stations in accordance with the third exemplary embodiment of the invention.

FIG. 16 is a flow chart of method, performed in a base station 300, of managing reverse link resources in a communication system 100 having geographically distributed base stations in accordance with the third exemplary embodiment of the invention.

At step 1602, a non-serving base station 1506 measures at least one coupled load parameter due to reverse link transmissions 210 of mobile stations 1502 served by other base stations 1504. In the third exemplary embodiment, during every transmission interval, the non-serving base station j measures the received pilot SNR (($E_{cp}/N_t)_{ji}$) and transmission rate on control and voice channels contributed by all MS i that have BS j in the Active Set but are not scheduled by BS j. Based on ($E_{cp}/N_t)_{ji}$ and the transmission rate $R_i$, the total coupled load (TotCoupledLoad$_j$) during the current transmission (indexed by n) are computed according to the following equation:

$$TotCoupledLoad_j[n] = \sum_{\substack{i: j \in Serving(i) \\ j \in ActiveSet(i)}} \frac{Sinr_{ji}(R_i, (C/P))}{1 + Sinr_{ji}(R_i, (C/P))}$$

where $Sinr_{ji}(R_i, (C/P)) = (E_{cp}/N_t)_{ji}(1 + (T/P)(R_i) + (C/P))$.

At step 1604, the base station 1506 estimates the expected coupled load for a future transmission based on the measured total coupled load of at least one previous transmission. Any of several techniques may be used to estimate the expected coupled load for a future transmission (TotCoupledLoadj[n+1]) and the particular technique depends on the type of communication system 100, the transmission structure of the reverse links 210, 212 and other factors. One suitable technique includes using the measured TotCoupledLoadj[n] as the expected value for TotCoupledLoadj[n+1]. Another technique includes calculating a filtered averaged value Exp_TotCoupledLoadj) to estimate TotCoupledLoadj[n+1] as specified by the following equation:

$$Exp\_TotCoupledLoad_j[n+1] + \sum_{i=0}^{L} \alpha_i TotCoupledLoad_j[n-i]$$

where $\alpha_i$ are the filter coefficients and L is the length of the filtering. Signal processing schemes may be employed to estimate the coefficients $\alpha_i$. Further, the coefficient $\alpha_i$ can be adaptively changed to minimize the mean square error between the estimated TotCoupledLoadj[n+1] and the actual measured TotCoupledLoadj[n+1] at time instant n+1.

Therefore, a total coupled load due to reverse link transmissions 210 of mobile stations served by other base stations for at least one previous transmission is determined. The estimated expected coupled is based on the previous total coupled loads and may be set equal to one of the previous coupled loads or may be determined by processing a plurality of coupled loads for previous transmissions periods. Other techniques may be used in some circumstances to determine the estimated expected coupled load based on previous coupled loads.

In systems with Hybrid-ARQ on reverse-link transmissions, the transmission of a packet is performed by multiple transmissions until the packet is successively received. If the delay between the first and the respective transmissions remain fixed, transmission line of a packet and its subsequent retransmissions is referred to as an ARQ instance. Due to retransmissions, a strong correlation between the coupled load during subsequent ARQ instances may exist. To take advantage of this correlation, TotCoupledLoad may be estimated from previous transmissions during the same ARQ instance.

At step 1606, the base station manages reverse link transmissions 210 of the mobile stations served by the base station in accordance with the estimated expected coupled load 1508. In the third exemplary embodiment, the non-serving base-station j, after determining the estimated expected coupled load Est_TotCoupledLoadj[n+1], updates the available capacity for scheduling the mobile stations that have base station j as the serving base station according to the following equation:

$$Cav_j = Cav_{j\_Est}\_TotCoupledLoad_j$$

The base stations j allocate the reverse link resources such that the total available capacity is not exceeded in the third exemplary embodiment. Accordingly, the base stations functioning as non-serving base stations 1506, in the third exemplary embodiment, estimate an expected coupled load due to all mobile stations 1502 served by other base stations 1504 and allocate reverse link resources to mobile stations served by the non-serving base station 1506 based on the remaining total capacity at the base station after taking into account the total expected coupled load.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method, performed in a base station functioning as a non-serving base station to at least one mobile station served by another base station, for allocating reverse link resources to mobile stations served by the base station in a distributed base station communication system, the method comprising:

measuring coupled load parameters of reverse link transmissions of the at least one mobile station served by another base station;

calculating an estimated expected coupled load due to reverse link transmissions of the at least one mobile station based on the coupled load parameters;

allocating reverse link resources to other mobile stations served by the base station in accordance with the estimated expected coupled load;

wherein the allocating the reverse link resources comprises scheduling data transmission rates to the other mobile stations served by the base station to create a total reverse link load due to the other mobile stations at the base station not exceeding a difference of a total capacity of the base station and the estimated expected coupled load;

wherein the estimating comprises calculating a previous coupled load due to the reverse link transmissions of the at least one mobile station based on the measured coupled load parameters measured during a previous transmission period, calculating the estimated expected coupled load based on the previous coupled wherein the calculating the estimated expected coupled load comprises calculating the estimated expected coupled load to be equal to the previous coupled load; wherein the calculating the previous coupled load comprises calculating a plurality of previous coupled loads;

wherein the calculating the estimated expected coupled load further comprises calculating a filtered avenged total expected coupled load of the plurality of previous coupled loads.

2. A method in accordance with claim 1, wherein the measuring the coupled load parameters comprises measuring an energy-per-chip-to-noise-plus-interference ratio ($E_{cp}/N_t$).

3. A method in accordance with claim 2, wherein calculating the estimated expected coupled load further comprises calculating the estimated expected coupled load based on a transmission data rate of reverse link signals transmitted by the at least one mobile station.

4. A method in accordance with claim 2, wherein calculating the estimated expected coupled load further comprises calculating the estimated expected coupled load based on a transmission power level of reverse link signals transmitted by the at least one mobile station.

5. A method, performed in a base station in a distributed base station communication system, the method comprising:

measuring coupled load parameters of reverse link transmissions of mobile stations served by other base stations;

calculating a total coupled load for a previous transmission period based on the coupled load parameters, the total coupled load representing a total load contribution due to reverse link transmissions of the mobile stations;

calculating an estimated expected coupled load for a current transmission based on the total coupled load;

calculating a total available capacity of the base station by subtracting the estimated expected coupled load from a total capacity of the base station; and allocating reverse link resources to other mobile stations served by the base station in accordance with the total available capacity;

wherein the allocating the reverse link resources comprises scheduling data transmission rates to the other mobile stations served by the base station to create a total reverse link load due to the other mobile stations at the base station not exceeding the total available capacity of the base station;

wherein the calculating the estimated expected coupled load comprises calculating the estimated expected coupled load to be equal to the previous coupled load; wherein the calculating the previous coupled load comprises calculating a plurality of previous coupled loads;

wherein the calculating the estimated expected coupled load further comprises calculating a filtered averaged total expected coupled load of the plurality of previous coupled loads.

6. A method in accordance with claim 5, wherein the measuring the coupled load parameters comprises measuring an energy-per-chip-to-noise-plus-interference ratio ($E_{cp}/N_t$).

7. A method in accordance with claim 6, wherein calculating the estimated expected coupled load for the current transmission further comprises calculating the estimated expected coupled load for the current transmission based on a transmission data rate of reverse link signals transmitted by the at least one mobile station.

8. A method in accordance with claim 7, wherein calculating the estimated expected coupled load for the current transmission further comprises calculating the estimated expected coupled load for the current transmission based on a transmission power level of the reverse link signals transmitted by the at least one mobile station.

9. A processor for a base station of a distributed base station communication system the processor configured to:

calculate a total coupled load due to reverse link transmissions of mobile stations served by other base stations for a previous transmission period based on the coupled load parameters measured at the base station;

calculate an estimated expected coupled load for a current transmission period based on the total coupled load; and calculating a total available capacity of the base station by subtracting the estimated expected coupled load from a total capacity of the base station;

wherein the processor further configured to allocate reverse link resources to other mobile stations served by the base station in accordance with the total available capacity;

wherein the processor is further configured to allocate the reverse link resources by scheduling data transmission rates to the other mobile stations served by the base station to create a total reverse link load due to the other mobile stations at the base station not exceeding the total available capacity of the base station;

wherein the processor is further configured to calculate the estimated expected coupled load by calculating the estimated expected coupled load to be equal to the previous coupled load;

wherein the processor is further configured to calculate the total coupled load by calculating a plurality of previous coupled loads;

wherein the processor is further configured to calculate the estimated expected coupled load by calculating a filtered averaged total expected coupled load of the plurality of previous coupled loads.

10. A processor in accordance with claim 9, wherein the coupled load parameters comprise an energy-per-chip-to-noise-plus-interference ratio ($E_{cp}/N_t$).

11. A processor in accordance with claim 9, wherein the processor is further configured to calculate the estimated expected coupled load for the current transmission period based on a transmission data rate of reverse link signals transmitted by the at least one mobile station.

12. A processor in accordance with claim 9, wherein the processor is further configured to calculate the estimated expected coupled load for the current transmission period based on a transmission power level of reverse link signals transmitted by the at least one mobile station.

* * * * *